(12) United States Patent
Kharwandikar

(10) Patent No.: US 10,757,207 B1
(45) Date of Patent: Aug. 25, 2020

(54) PRESENCE DETECTION

(71) Applicant: Amazon Technologies, Inc., Seattle, WA (US)

(72) Inventor: Nikhil Avinash Kharwandikar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/125,411

(22) Filed: Sep. 7, 2018

(51) Int. Cl.
   G08B 21/22      (2006.01)
   H04L 29/08      (2006.01)
   G06F 16/955     (2019.01)
   G10L 25/78      (2013.01)

(52) U.S. Cl.
   CPC ............ *H04L 67/22* (2013.01); *G06F 16/955* (2019.01); *G08B 21/22* (2013.01); *G10L 25/78* (2013.01)

(58) Field of Classification Search
   CPC ....... H04L 67/22; G06F 16/955; G10L 25/78; G08B 21/22

USPC ..................................................... 340/573.1
   See application file for complete search history.

(56) References Cited

U.S. PATENT DOCUMENTS

| | | | |
|---|---|---|---|
| 2018/0124553 A1* | 5/2018 | White, Jr. | H04W 64/00 |
| 2018/0232902 A1* | 8/2018 | Albadawi | A61B 5/0205 |

\* cited by examiner

*Primary Examiner* — Qutbuddin Ghulamali
(74) *Attorney, Agent, or Firm* — Pierce Atwood LLP

(57) ABSTRACT

Techniques for amalgamating various types of signals (including ad hoc and regular-interval signals) to determine presence and/or absence of individuals are described. A signal may be assigned a time period with respect to which the signal may be relied on for purposes of presence or vacancy calculations. The time period may vary alternatively be assigned based on when another signal of the same type will be received. A system may receive a user input requesting whether an individual is present near a device or in a location. In response, the system may identify signals that were received and associated with the device or location. The system may determine, for each signal, a weight that the signal should be applied with in presence calculations. The system may calculate a presence or absence confidence based on each signal's time period of usefulness and weight.

16 Claims, 15 Drawing Sheets

FIG. 2B

| Device Identifier | User Identifier | Location Identifier | Presence Signal Type | Time Interval | Weight Value | Timestamp |
|---|---|---|---|---|---|---|
| 123 | 12345 | abc | User Identifier | 5 Minutes | High | 2018-07-20 0800 |
| 234 | 12345 | abc | Wakeword | 2 Minutes | Medium | 2018-07-20 0800 |
| 345 | 23456 | bcd | Wakeword | 2 Minutes | Low | 2018-07-20 0845 |
| 456 | <Null> | <Null> | AED | 30 Seconds | 0.3 | 2018-07-20 1450 |
| 567 | <Null> | <Null> | BLE | 10 Seconds | 15 | 2018-07-20 1200 |

PRESENCE DETECTION

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of a computing device to perform tasks based on the user's spoken commands. The combination of speech recognition processing and natural language understanding processing techniques is referred to herein as speech processing. Speech processing may also involve converting a user's speech into text data which may then be provided to skills.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2B is a conceptual diagram illustrating how presence signals may be stored according to embodiments of the present disclosure.

DETAILED DESCRIPTION

Figure 1:
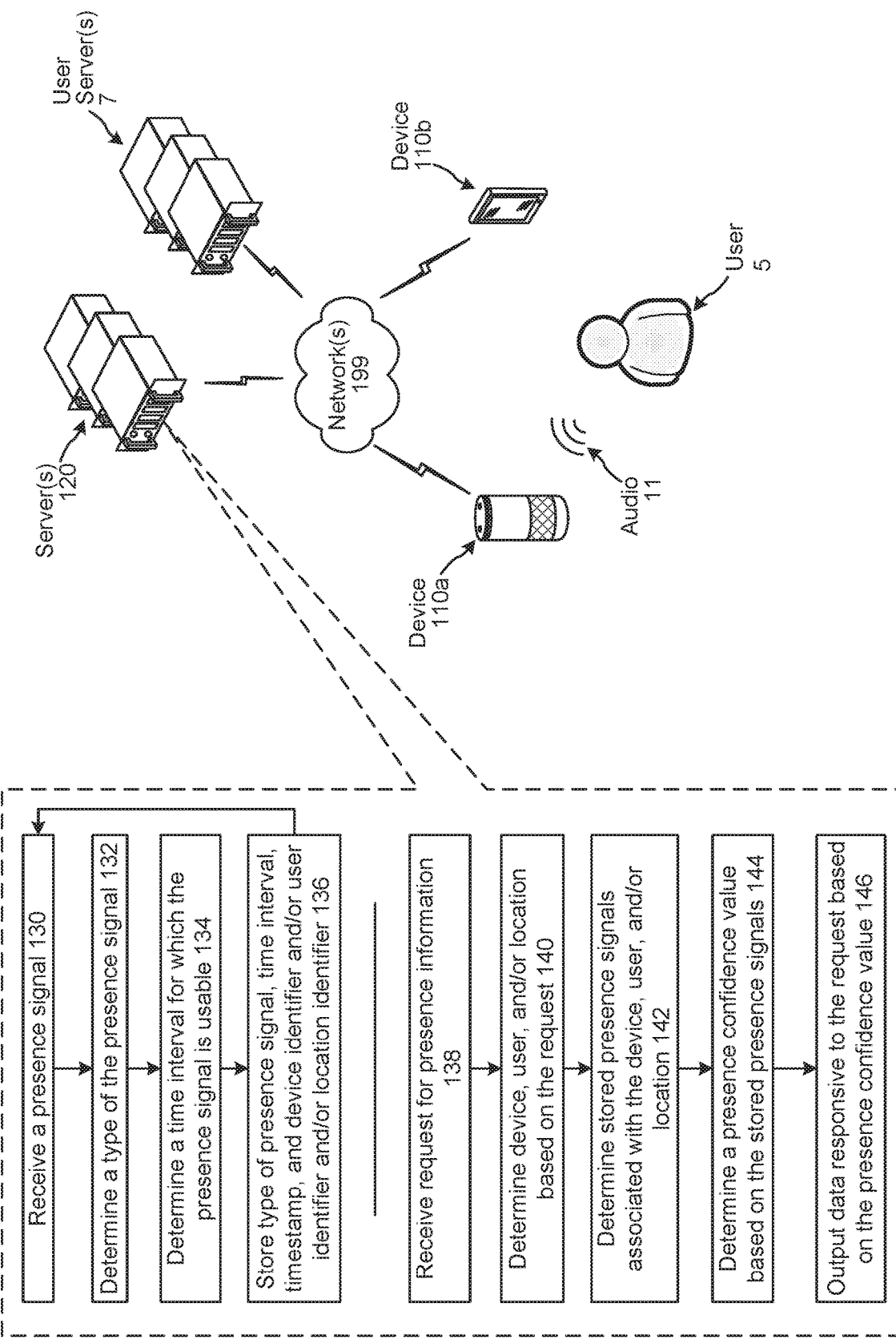
FIG. 1 illustrates a system configured to use previously received signals to determine a presence confidence in response to a request for presence information according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with the generation of synthesized speech. ASR, NLU, and TTS may be used together as part of a system.

A system may be configured to detect presence of a user based on the user providing a device of the system with input. Presence may be based on simply receiving an input. For example, a user may be determined present near a device once the device receives a user input. Presence may also or alternatively be based on recognition of a specific user. For example, a system may determine speech characteristics of a spoken input correspond to stored speech characteristics of a particular user and, therefrom, determine the particular user is present near the device. Other user recognition processing is also possible.

A system may also or alternatively be configured to detect presence based on beacon signals. Beacon signals refer to signals that are output at regular intervals to detect presence of a user.

The present disclosure improves systems by amalgamating various types of signals (including ad hoc and regular-interval signals) to determine presence and/or absence of individuals. Use of various signals, as described herein, enables a system to determine presence and absence of individuals with greater confidence.

A received signal may be assigned a time period with respect to which the signal may be relied on for purposes of presence or vacancy calculations. The time period assigned may be based on the reliability of the signal. The time period may also or alternatively be assigned based on when another signal of the same type is expected to be received. For example, a first beacon may only be considered reliable until the next beacon is expected. Or a different signal may have a certain decay period depending on the type of signal it is, etc.

After the signal is received, the system may receive a user query requesting to know if an individual is present near a particular device or in a particular location. For example, such user query may correspond to "Alexa, is someone in the living room."

In response to receiving the user query, the system may identify signals that were received and associated with the living room (or one or more devices located therein). The system may determine, for each signal, a weight that the signal should be applied with in presence calculations. A weight of a signal may represent how reliable a signal is. For example, if a signal is reliable, it may be associated with a "high" weight. For further example, if a signal is moderately reliable, it may be associated with a "medium" weight." In another example, if a signal is relatively unreliable, it may be associated with a "low" weight. Reliability may also be determined based on how old the signal data is.

The system may calculate a presence or absence confidence based on each signal's time period of usefulness and weight. In an example, the system may calculate a weighted average using the signals' time periods and weights.

The system may output an indicator representing whether the system thinks a user is present at or absent from a device or location based on the generated confidence. Such output may correspond to audio and/or displayed text. For example, such output may correspond to "a user is present," "a user is likely present," "a user is likely not present," "a user is not present," and the like.

If the request for presence information is specific to a particular user, the above presence and absence calculations may be determined using signals associated with the particular user. In such situations, the output of the system may be user specific. For example, output of the system may correspond to "[user name] is present," "[user name] is likely present," "[user name] is likely not present," "[user name] is not present," and the like.

As described, a system may determine whether a user is present near a particular device, or at a particular location, in response to a user input. A system may also or alternatively determine whether a user is present proactively.

A system may be associated with services configured to perform actions based on presence. For example, a system may be associated with a smart home service that is configured to lock doors, turn off lights, close garage doors, etc. when a user is not present. The system may know when such services may request presence information (similar to how a user would request such presence information, except the request may originate from a computing system). Thus, the system may perform the above described presence calculations prior to when the system anticipates receiving a request, and may proactively send a notification, representing the calculations, to the appropriate service.

The teachings of the present disclosure improve presence detection of computing systems because the herein described teachings enable systems to use various types of previously received signals to accurately determine presence (or vacancy) at a later time.

The teachings of the present disclosure may be ordinarily configured to be opt-in features of a system. For example, while a system may be configured to perform the teachings herein, the system may not perform such teachings with respect to a user unless the user has explicitly provided permission for the system to perform the teachings herein with respect to the user. In addition, a system may be configured to enable a user to opt-out of the teachings herein, resulting in the system no longer performing the teachings herein with respect to that user. As such, it will be appreciated that a user may have significant control over when a system performs presence detection with respect to that user.

FIG. 1 illustrates a system configured to use previously received signals to determine a presence confidence in response to a request for presence information. Although the figures and discussion of the present disclosure illustrate certain operational steps of the system in a particular order, the steps described may be performed in a different order (as well as certain steps removed or added) without departing from the intent of the disclosure. Devices (110*a*/110*b*) local to a user 5, one or more user servers 7, and one or more servers 120 may communicate across one or more networks 199.

The server(s) 120 may receive (130) a presence signal. The server(s) 120 may determine (132) a type of the presence signal. A presence signal may be an ad hoc signal, meaning the signal is of a type that the server(s) 120 cannot accurately determine when it will receive a subsequent signal of the same type from the same source. A presence signal may alternatively be a regular interval signal, meaning the signal is of a type that the server(s) 120 receives at regular intervals from the same source.

Ad hoc and regular interval signals may be broken down into further types of signals. Types of ad hoc signals include wakeword signals (e.g., generated when a device 110 detects a spoken user input), user identifier signals (e.g., generated when an identity of a user that provided a user input is determined), touch event signals (e.g., generated when a user physically interacts with a device), ultrasonic signals, etc. Types of regular interval signals include audio event detection (AED) signals, global positioning system (GPS) signals, heart rate signals, etc. Types of GPS signals include Bluetooth Low Energy (BLE) signals, geo-fencing signals, last known GPS location signals, WiFi signals, etc.

An ad hoc signal may be generated in response to a user input received by the system. An example ad hoc signal is a "wakeword" signal. When a user speaks an input to a device 110, the input may be started with the speaking of a wakeword, such as "Alexa." When the device 110 detects the wakeword, the device 110 may send audio data (representing at least the user input spoken after the wakeword) to the server(s) 120. Receipt of the audio data by the server(s) 120, in this situation, may correspond to receipt of a wakeword signal at step 130. Another example ad hoc signal is a "user identifier" signal. When a user provides an input to the system, the server(s) 120 may perform various operations to identify the user. The server(s) 120's determination of the user's identity may correspond to receipt of a user identifier signal at step 130. Other types of ad hoc signals are possible.

A regular interval signal may be generated irrespective of a user input. Using an AED signal as an example, an AED signal may be used by a device 110 at regular intervals to determine what noises are present in the device 110's environment. An AED signal may be used to detect human speech, media sounds (e.g., audio outputs of devices), non-speech sounds generated by humans, background noise, etc. Other types of regular interval signals are possible.

In some instances, a received signal may be a conglomerate signal representing more than one presence signal. In such instances, the server(s) 120 may isolate each of the more than one presence signal, and may perform the following processes with respect to each of the isolated presence signals.

The server(s) 120 determines (134) a time interval representing how long the received presence signal is usable in presence calculations. That is, a time interval may represent a length of time corresponding to a reliability of an associated presence signal. A time interval for a presence signal may be a length of time that starts when the presence signal was received. After a time interval for a signal has ran, the presence signal may be considered unreliable for presence calculations.

A time interval for a presence signal may be based on a type of the presence signal. Different types of presence signals (e.g., ad hoc v. regular interval, wakeword v. user identifier, etc.) may be associated with different time intervals (as illustrated in FIG. 2B). For example, a user identifier signal may be associated with a first time interval, a wakeword signal may be associated with a second time interval, etc. The time interval for a more reliable presence signal may be longer than the time interval for a less reliable presence signal.

For regular interval presence signals, time intervals may be determined based on how regularly the presence signals are received. For example, if an AED signal of a particular device is received every 30 seconds, the time interval for each AED signal of that device may be 30 seconds.

Figure 2A:
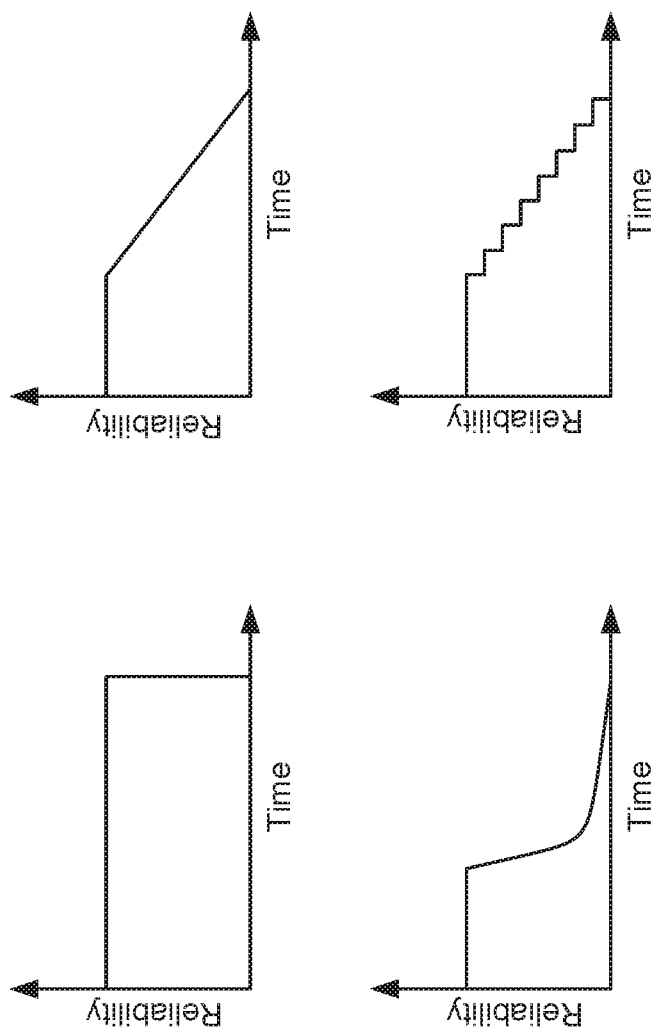
FIG. 2A illustrates several example time intervals according to embodiments of the present disclosure.

Referring to FIG. 2A, time intervals may take on various forms (in addition to various lengths as described above). That is, reliability of a presence signal may decay in various manners. While FIG. 2A illustrates specific manners in which a presence signal's reliability may decrease as time transpires through a time interval, one skilled in the art will appreciate that other manners of reliability decay are possible. Moreover, while FIG. 2A illustrates a length of time where a presence signal's reliability remains constant prior to decreasing, one skilled in the art will appreciate that a presence signal's reliability may start to decrease at the beginning of the time interval.

Referring back to FIG. 1, the server(s) 120 creates an association between and stores (136) the type of the presence signal, the presence signal's time interval, a timestamp representing when the presence signal was received, and a device identifier (representing the device that captured or originated the presence signal) and/or a user identifier (that originated a user input represented by the presence signal) and/or location identifier (representing a geographic location from which the presence signal was originated). For example, a location identifier may represent a particular room of a building, a particular building, a city, a county, a state, etc. A location identifier may be associated with more than one device identifier. For example, a location identifier may represent a room of a building and the room of the building may include more than one device that is configured to transmit at least presence signals to the server(s) 120.

If the newly stored presence signal is an interval signal (e.g., one that is received periodically), storage of the new presence signal may be cumulative (e.g., the previously stored presence signal to which it relates may be permitted to be represented in storage). Alternatively, the previously stored presence signal may be deleted from storage and replaced with the new presence signal related thereto. This ensures the storage only includes the most recent presence signal of a particular type received for a particular device and/or user and/or location.

Steps 130 through 136 may occur with respect to various devices and users of the system. As represented in FIG. 2B, the server(s) 120 may store various presence signals and corresponding data. By storing presence signals to indicate their type, time interval, and timestamp, the system of the present disclosure enables other systems, in communication with the system of the present disclosure, to use this presence information for their own purposes while also maintaining user privacy.

The device 110a may receive audio 11 representing a spoken user request for presence information that originated from the user 5. The device 110a may generate audio data representing the request and may send the audio data to the server(s) 120, which the server(s) 120 receives (138). The server(s) 120 may perform ASR processing on the audio data to generate text data representing the request.

The device 110b may receive a text input representing a request for presence information that originated from the user 5. The device 110b may generate text data representing the request and may send the text data to the server(s) 120, which the server(s) 120 receives (138).

A computing device(s) (e.g., the user server(s) 7) may send an input to the server(s) 120, with the input requesting presence information. The server(s) 120 may receive (138) the input from the user server(s) 7 as text data. The user server(s) 7 may be a smart home system, hotel system, or the like.

The server(s) 120 determines (140) a device, user, and/or location based on the received request. For example, the server(s) 120 may perform NLU processing on the text data representing the request and determine NLU results data represents a particular device, a particular user, and/or a particular location. For example, for the text data of "is someone in the living room," the NLU results data may indicate the request relates to a "living room." For further example, for the text data of "where is John," the NLU results data may indicate the request relates to "John." In another example, for the text data of "is anyone near the living room device," the NLU results data may indicate the request relates to "living room device." During entity resolution, performed as part of NLU processing, the server(s) 120 may determine text data of the user input representing a particular device, user, or location corresponds to a particular device identifier, user identifier, or location identifier known to the server(s) 120. For example, the server(s) 120 may determine "living room" corresponds to location identifier abc, which may in turn be associated with one or more device identifiers. For further example, the server(s) 120 may determine "John" corresponds to user identifier 12345. In another example, the server(s) 120 may determine "living room device" corresponds to device identifier 123.

The server(s) 120 determines (142) stored presence signals associated with the determined device, user, and/or location. For example, the server(s) 120 may identify data, in presence signal storage, associated with a device identifier (representing a device represented in the request), a user identifier (representing a user represented in the request), and/or a location identifier (representing a location represented in the request).

The server(s) 120 determines (144) a presence confidence value based on the stored presence signals and outputs (146) data responsive to the request based on the presence confidence value. For example, the output data may be a binary output (e.g., may indicate someone is present or may indicate someone is not present). For further example, the output data may be non-binary (e.g., may indicate someone is present, may indicate someone is likely present, may indicate someone is not likely present, may indicate someone is not present, or the like). Each type of output may correspond to a respective presence confidence value, or respective range of presence confidence values. The data responsive to the request may be audio content and/or visual content.

Figure 3:
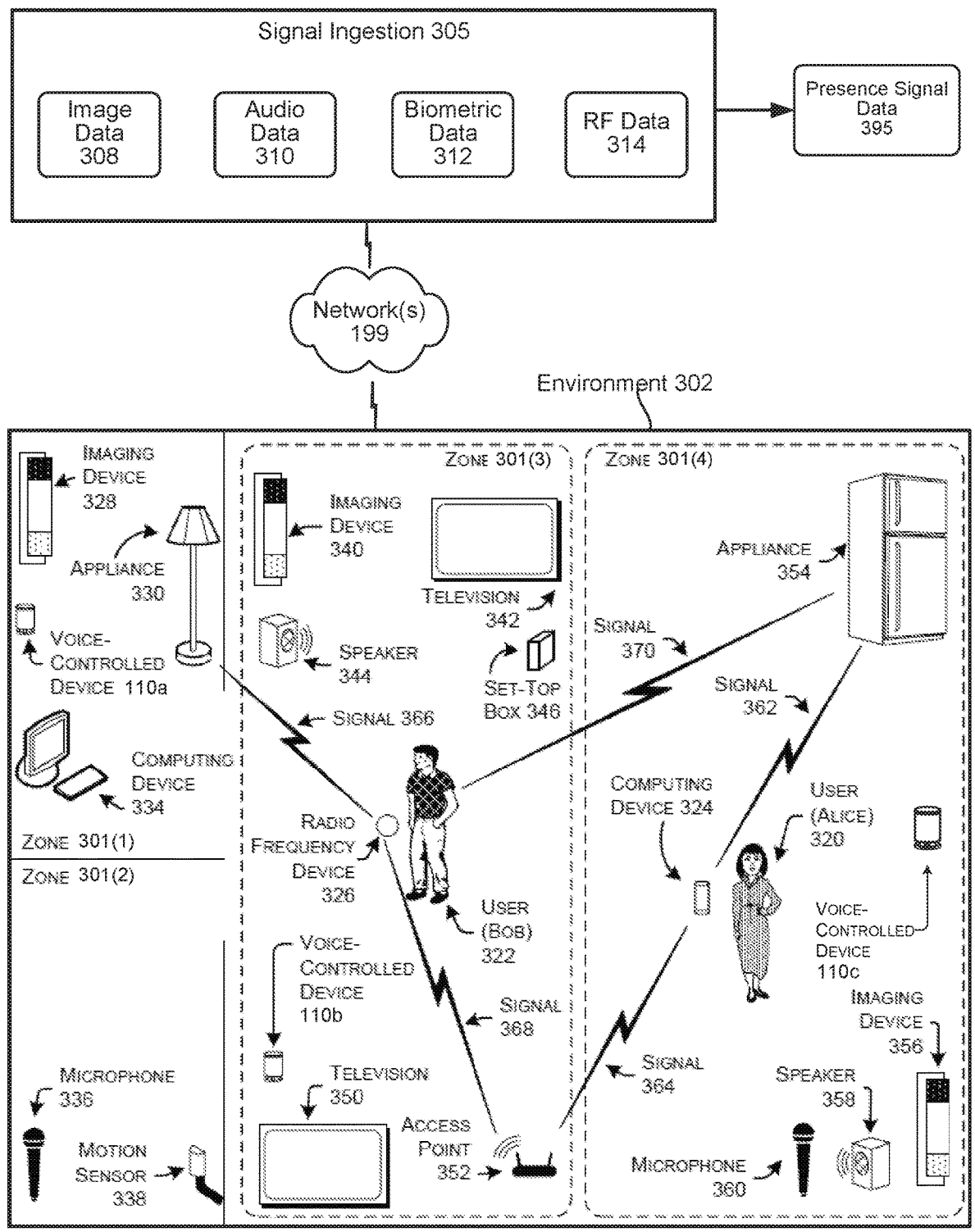
FIG. 3 is a schematic diagram of an illustrative architecture in which sensor data is combined to determine locations of users according to embodiments of the present disclosure.

A signal ingestion component 305 may receive various presence signals from various sources. As illustrated in FIG. 3, the signal ingestion component 305 may receive image data 308, audio data 310, biometric data 312, and radio frequency (RF) data 314 (as well as other data not illustrated). The signal ingestion component 305 may output presence signal data 395, which may represent a single received signal or multiple received signals. Each signal, represented in the presence signal data 395, may be associated with a respective device identifier of the device that originated the signal and/or user identifier and/or location identifier. Output of the signal ingestion component 305 may be used to inform processes of various components of the server(s) 120.

In some instances, an environment 302 may represent a home or office associated with a user 320 "Alice" and/or a user 322 "Bob." In some instances, the user 320 "Alice" may be associated with a computing device 324, such as a smartphone. In some instances, the user 322 "Bob" may be associated with a radio frequency device 326, such as a wearable device (e.g., a smartwatch) or an identifier beacon.

The environment 302 may include, but is not limited to, a number of devices that may be used to locate a user. For example, within zone 301(1), the environment 302 may include an imaging device 328, an appliance 330, a voice-controlled device 110*a*, and a computing device 334. Within zone 301(2), the environment 302 may include a microphone 336 and a motion sensor 338. Within zone 301(3), the environment may include an imaging device 340, a television 342, a speaker 344, a set-top box 346, a voice-controlled device 110*b*, a television 350, and an access point 352. Within zone 301(4), the environment 302 may include an appliance 354, an imaging device 356, a speaker 358, a voice-controlled device 110*c*, and a microphone 360.

In some instances, the signal ingestion component 305 may receive image data 308 from one or more sensors capable of providing images (e.g., such as the imaging devices 328, 340, 356 and the computing devices 324 and 334) or sensors indicating motion (e.g., such as the motion sensor 338).

In some instances, signal ingestion component 305 may receive biometric data 312 representing fingerprints, iris or retina scans, thermal scans, weights of users, a size of a user, pressure (e.g., within floor sensors), etc.

In some instances, the signal ingestion component 305 may receive RF data 314. For example, the computing device 324 may emit RF signals (e.g., Wi-Fi, Bluetooth®, etc.), which are illustrated as signals 362 and 364. The appliance 354 may detect the signal 362 and the access point 352 may detect the signal 364. In some instances, the access point 352 and the appliance 354 may send, to the signal ingestion component 305, RF data 314 representing the strength of the signals 364 and 362 (e.g., as a received signal strength indication (RSSI)), respectively. In some instances, the RF data 314 may represent a RF signal is associated with a mobile device that is associated with a particular user. In some instances, a device (e.g., the access point 352) may be configured with multiple antennas to determine a location of a user relative to the device using beamforming or spatial diversity techniques. In such a case, the RF data 314 may indicate a direction of the user relative to an individual device.

As illustrated, the appliance 330 may receive a signal 366 from the RF device 326 associated with the user and a user profile, while the access point 352 may receive a signal 368. Further, the appliance 354 can receive a signal 370 from the RF device 326. In an example where there is some uncertainty about an identity of the users in zones 301(3) and 301(4), the RSSI of the signals 362, 364, 366, 368, and/or 370 may be used to increase or decrease a confidence level of an identity and/or location of the users, such as the user 320 and 324. For example, if an RSSI of the signal 362 is higher than the RSSI of the signal 370, the system may determine that it is more likely that a user in the zone 301(4) is the user 320 than the user 322. In some instances, a confidence level of the determination may depend on a relative difference of the RSSIs, for example.

In some instances a device 110 may include some RF or other detection processing capabilities so that a user who speaks an utterance may scan, tap, or otherwise acknowledge his/her personal device (such as a phone) to a sensing device in the environment 302. In this manner the user may "register" with the system for purposes of the system determining who spoke a particular utterance. Such a registration may occur prior to, during, or after speaking of an utterance.

In some instances, the signal ingestion component 305 may receive audio data 310 from one or more sensors capable of providing an audio signal (e.g., the voice-controlled devices 110*a-c*, the microphones 336 and 360, the computing devices 324 and 334, the set-top box 346). The audio data 310 may represent speech of a user. The audio data 310 may also represent environmental noise surrounding a device (for purposes of determining whether a user is the device's surroundings even though the user may not be talking). In some instances, the imaging devices 328, 340, and 356 may provide the audio data 310. In some instances, the signal ingestion component 305 may receive audio data 310 from one or more devices. In some instances, if multiple sources of audio are available, the system may determine that two audio signals correspond to the same source of sound, and may compare the relative amplitudes or volumes of the audio signal to determine a location of the source of sound. In some instances, individual devices may include multiple microphones and may determine a direction of a user with respect to an individual device.

Figure 4:
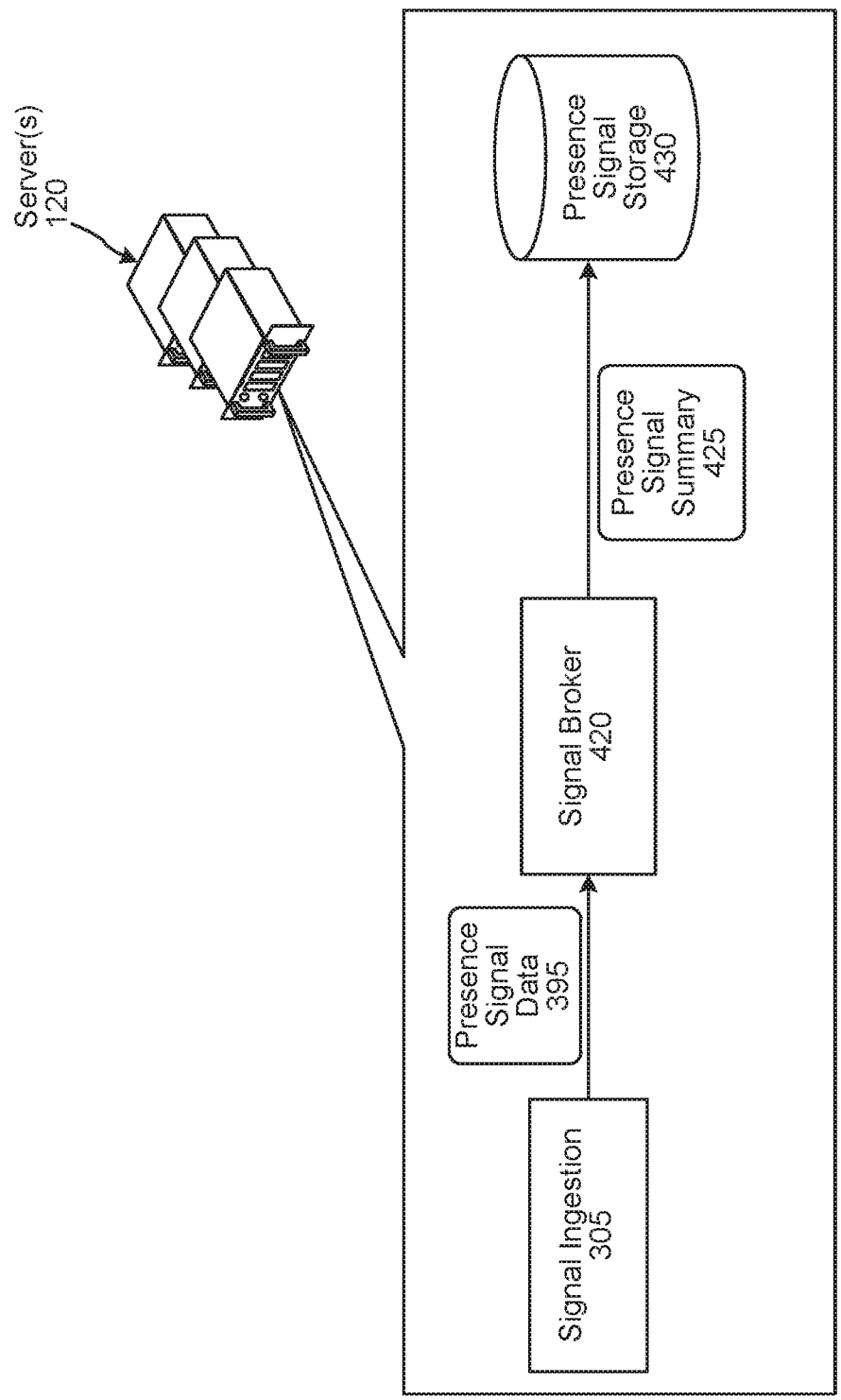
FIG. 4 is a conceptual diagram illustrating how presence signals may be ingested and stored according to embodiments of the present disclosure.

FIG. 4 illustrates how the server(s) 120 is configured to ingest and store presence signals. The server(s) 120 is configured with the signal ingestion component 305, a signal broker component 420, and presence signal storage 430.

The signal ingestion component 305 may be in communication with devices (that generate presence signals) external to the server(s) 120. Such devices may include devices 110, beacons, etc. The signal ingestion component 305 may receive presence signals from such devices via the Internet, for example.

The signal ingestion component 305 may also or alternatively be in communication with components (that generate presence signals) internal to the server(s) 120. Such components may include a user recognition component (described in detail below) that is configured to generate a user identifier signal.

The signal broker component 420 may receive presence signal data 395 from the signal ingestion component 305. The signal broker component 420 determines a time interval representing how long the presence signal data 395 may be used in presence calculations. The signal broker component 420 persists a presence signal summary 425 in presence signal storage 430. The presence signal summary 425 may represent the type of the presence signal data 395, a device identifier associated with the presence signal data 395, a user identifier associated with the presence signal data 395, a location identifier associated with the presence signal data 395, a timestamp representing when the presence signal data 395 was output from the signal ingestion component 305 (or when the data used to determine the presence signal data 395 was received by the signal ingestion component 305), the time interval determined by the signal broker component 420, and/or a weight value representing the presence signal data 395's reliability in presence calculations (as illustrated in FIG. 2B).

The signal broker component 420 may persist presence signal summaries, for various received presence signals of the system, in presence signal storage 430. As such, presence signal storage 430 may represent different types of presence signals, presence signals received from different devices, presence signals associated with different users, and/or presence signals associated with different locations (as illustrated in FIG. 2B).

The signal broker component 420 may determine the presence signal data 395's time interval based on a type of the presence signal data 395. The signal broker component 420 may have access to a predetermined list of signal types, with each signal type in the list being associated with a respective time interval. The signal broker component 420 may determine the presence signal data 395's type (e.g., AED, wakeword, user identifier, BLE, etc.) and may determine a time interval associated with the presence signal data 395's type in the predetermined list.

The signal broker component 420 may also or alternatively determine the presence signal data 395's time interval based on when the signal broker component 420 expects to receive a subsequent presence signal of the same type from the same source. The presence signal data 395 may be associated with a device identifier representing a device that originated the presence signal. The device that originated the presence signal may be a device external to the server(s) 120 or a component of the server(s) 120. The signal broker component 420 may have access to stored data representing devices and how often each of the devices will send a specific type of presence signal to the signal ingestion component 305. For example, the stored data may represent a device identifier will send an AED signal to the signal ingestion component 305 every 30 seconds. The signal broker component 420 may use the device identifier, associated with the presence signal data 395, and the presence signal data 395's type to determine a time interval for the presence signal data 395 within the aforementioned stored data.

The signal broker component 420 may also or alternatively implement one or more trained machine learning models configured to determine a time interval for the presence signal data 395 using various pieces of data. Illustrative pieces of data the trained machine learning model(s) may consider include historical usage data representing previous user interactions with the system. When the signal broker component 420 receives the presence signal data 395, the signal broker component 420 may query storage for historical usage data associated with a device identifier, user identifier, and/or location identifier associated with the presence signal data 395.

The trained model(s) of the broker component 420 may process the determined historical usage data to determine a time interval for the presence signal data 395. For example, if the presence signal data 395 is a wakeword signal associated with a device identifier, the signal broker component 420 may use the trained model(s) to determine a pattern of when the device (associated with the device identifier) may receive a subsequent user input, and may determine a time interval that spans between when the user input (resulting in the generation of the presence signal data 395) was received and ending when the signal broker component 420 expects the device (associated with the device identifier) to receive a subsequent user input. For further example, if the presence signal data 395 is a user identifier signal, the signal broker component 420 may use the trained model(s) to determine a pattern of when the user (associated with a user identifier associated with the presence signal data 395) may input a subsequent user input to the system, and may determine a time interval that spans between when the user input (resulting in the generation of the presence signal data 395) was received and ending when the signal broker 420 expects the system to receive a subsequent user input from the user. In another example, if the presence signal data 395 is a user identifier signal, the signal broker component 420 may use the trained model(s) to determine a pattern of when the user (associated with a user identifier associated with the presence signal data 395) may input a subsequent user input to the device (associated with the device identifier associated with the presence signal data 395), and may determine a time interval that spans between when the user input (resulting in the generation of the presence signal data 395) was received and ending when the signal broker component 420 expects the device (associated with the device identifier associated with the presence signal data 395) to receive a subsequent user input from the user. The signal broker component 420 may implement the trained model(s) to determine time intervals based on other data not explicitly described above.

The signal broker component 420 may be configured to determine a weight value for the presence signal data 395. The weight value may be used to distinguish the presence signal data 395's presence detection reliability with respect to other presence signals that may be used in the same presence calculations.

The signal broker component 420 may determine a weight value for the presence signal data 395 based on the presence signal data 395's type. The signal broker component 420 may have access to a predetermined list of signal types, with each signal type in the list being associated with a respective weight value. The signal broker component 420 may determine the presence signal data 395's type (e.g., AED, wakeword, user identifier, BLE, etc.) and may determine a weight value associated with the presence signal data 395's type in the predetermined list. The weight value may be a binned value (e.g., high, medium, low) or may be a numeric value (e.g., on a scale of 0-1). For example, a user identifier signal may be considered a strong identifier and, thus, may be assigned a high weight value. Conversely, an AED signal representing a media sound may be a minimally reliable presence indicator and, thus, may be assigned a low weight value.

The signal broker component 420 may also or alternatively determine a weight value for the presence signal data 395 using one or more trained machine learning models. The trained model(s) may consider historical user data. For example, if the presence signal data 395 is a wakeword signal associated with a device identifier, and historical usage data associated with the device identifier represents the device (associated with the device identifier) routinely receives a subsequent user input within a threshold amount of time, the trained model(s) may generate a high weight value for the presence signal data 395. For further example, if the presence signal data 395 is a wakeword signal associated with a device identifier, and historical usage data associated with the device identifier represents the device (associated with the device identifier) does not routinely receive a subsequent user input within a threshold amount of time, the trained model(s) may generate a low weight value for the presence signal data 395. In another example, if the presence signal data 395 is a user identifier signal associated with a user identifier and device identifier, and historical usage data associated with the device identifier represents the device (associated with the device identifier) routinely receives a subsequent user input (from the user associated with the user identifier) within a threshold amount of time, the trained model(s) may generate a high weight value for the presence signal data 395. In another example, if the presence signal data 395 is a user identifier signal associated with a user identifier and device identifier, and historical usage data associated with the user identifier represents the user routinely provides the system with a subsequent user input within a threshold amount of time of the system receiving the presence signal data 395, the trained model(s) may generate a high weight value for the presence signal data 395. Other implementations of a trained model(s) to determine a weight value are also possible.

A machine learning model may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
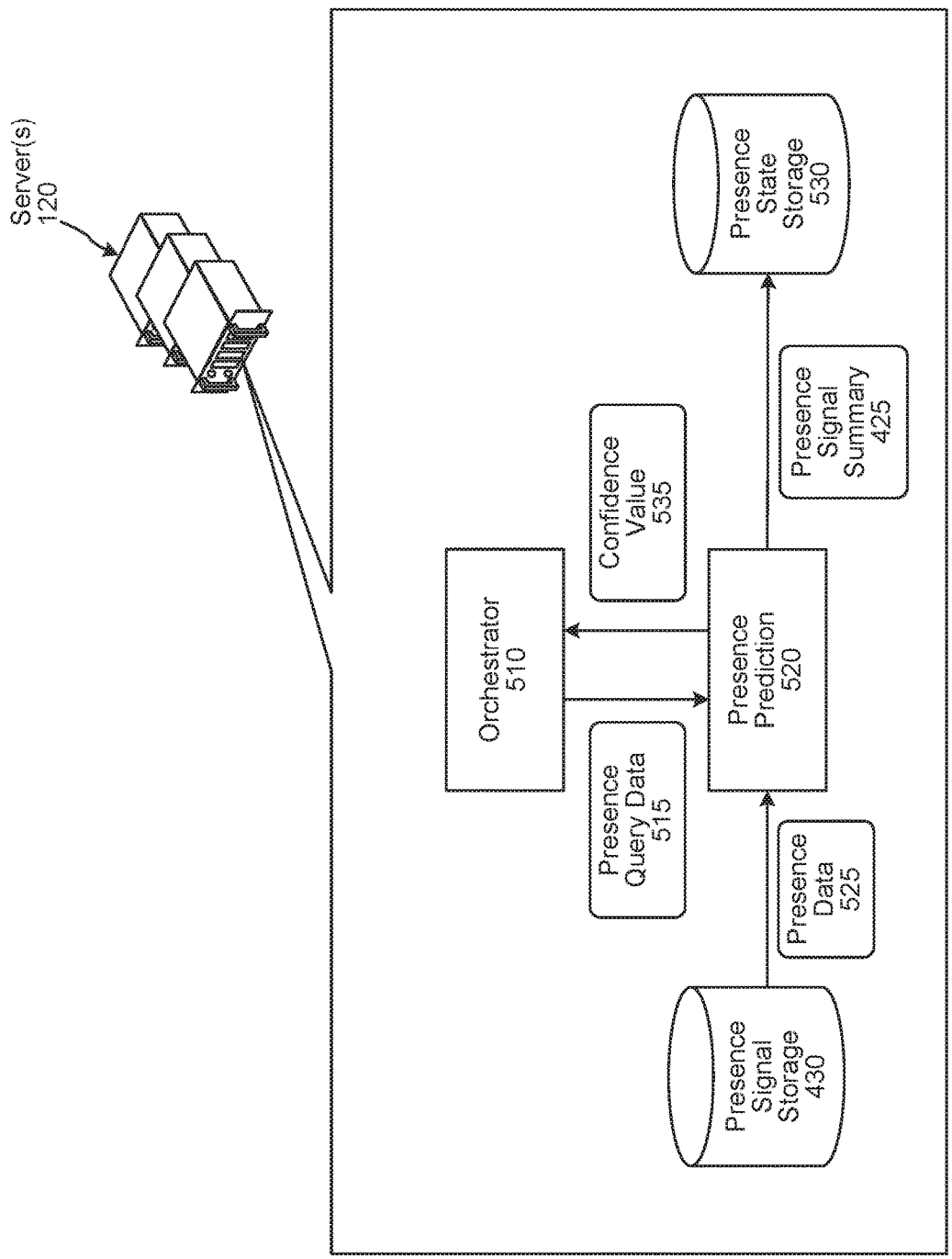
FIG. 5 is a conceptual diagram illustrating how presence may be determined in response to a request for presence information according to embodiments of the present disclosure.

The system may be configured to receive inputs requesting whether anyone (or a particular person) is located at a specific location, determine whether anyone (or the particular person) is located at the specific location, and output content representing such determination. FIG. 5 illustrates how the server(s) 120 is configured to respond to a request for presence information. The server(s) 120 includes an orchestrator component 510, a presence prediction component 520, presence signal storage 430, and presence state storage 530.

When the server(s) 120 receives a user input (from a human user or a computing device, such as a device associated with a hotel asking if a hotel room is vacant for purposes of housekeeping, etc.), the server(s) 120 may perform ASR processing and/or NLU processing to generate NLU results data representing the user input requests presence information with respect to a particular device, user, and/or location. The NLU results data may be sent from an NLU component of the server(s) 120 (described in detail below) to the orchestrator component 510. The orchestrator component 510 may generating presence query data 515 including a device identifier, a user identifier, and/or a location identifier representing a device, user, and/or location represented in the NLU results data. The orchestrator component 510 may send the presence query data 515 to the presence prediction component 520.

The presence prediction component 520 queries presence signal storage 430 for presence data 525 associated with the received presence query data 515 (e.g., associated with the device identifier, user identifier, and/or location identifier represented in the presence query data 515). The presence data 525, received by the presence prediction component 520, may include data representing more than one presence signal. The data representing a single presence signal in the presence data 525 may include a presence signal type, time interval, weight value, and timestamp, among other things.

The presence prediction component 520 generates a presence confidence value based on the received presence data 525. The presence prediction component 520 may determine a present usefulness of a given presence signal based on the presence signal's time interval, when the presence signal was received, and a present time. For each presence signal, the presence prediction component 520 may start a presence signal's time interval at a time represented in the presence signal's timestamp, and may determine where, in the presence signal's time interval, the present time is represented. The presence prediction component 520 may assign a higher confidence value the closer the present time is to the timer interval's start time, and vice versa.

The presence prediction component 520 may take a weighted average of each of the calculated confidence values using the weight value associated with each presence signal. This results in a confidence value representing the presence prediction component 520's determination regarding whether someone is present. In other words, a confidence value may represent a likelihood that a user is near a device(s). The confidence value may be a numeric value or a binned value. For example, a "no confidence" binned value may correlate to a numeric value of <5%, a "low confidence" binned value may correlate to a numeric value of 5% to <30%, a "low-medium confidence" binned value may correlate to a numeric value of 30% to <50%, a "medium confidence" binned value may correlate to a numeric value of 50% to <70%, a "medium-high confidence" binned value may correlate to a numeric value of 70% to <85%, a "high confidence" binned value may correlate to a numeric value of 85% to <95%, and a "very high confidence" binned value may correlate to a numeric value of >95%. The presence prediction component 520 may persist the confidence value in presence state storage 530. The presence prediction component 520 may also send the confidence value 535 (representing a likelihood that a user is present near a device(s)) to the orchestrator component 510, which may cause content to be output to a user based on the confidence value 535. The presence prediction component 520 may implement one or more trained machine learning models to perform the foregoing calculations.

Figure 6:
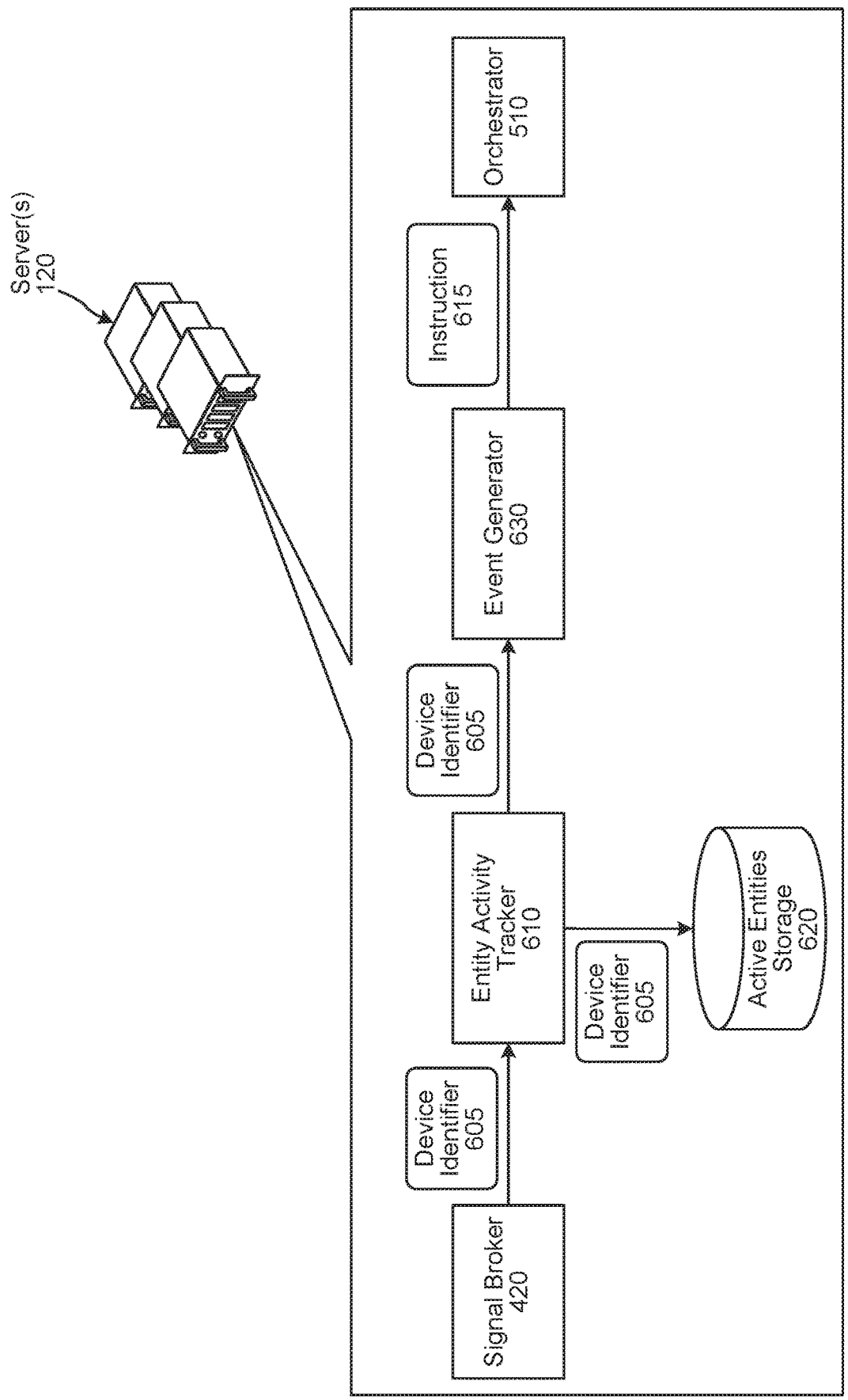
FIG. 6 is a conceptual diagram illustrating how presence or vacancy may be proactively determined according to embodiments of the present disclosure.

The system may also or alternatively be configured to proactively indicate presence or vacancy, without receiving a user input requesting same. FIG. 6 illustrates how the server(s) 120 is configured to proactively indicate presence or vacancy. The server(s) 120 includes the signal broker component 420, an entity activity tracker component 610, active entities storage 620, an event generator component 630, and the orchestrator component 510.

When the signal broker component 420 receives a presence signal from a device, the signal broker component 420 sends a device identifier 605 (e.g., representing the device's serial number), and optionally a timestamp representing when the presence signal was received, to the entity activity tracker component 610.

The entity activity tracker component 610 communicates with active entities storage 620 to determine whether the device identifier 605 is represented in active entities storage 620. For example, a device's identifier (e.g., serial number) may be deleted from active entities storage 620 (or disassociated with an active status) if the entity activity tracker component 610 does not receive a subsequent same device identifier within a threshold amount of time of the timestamp associated with the device identifier 605 (or since the device identifier was persisted in active entities storage 620). If the entity activity tracker component 610 determines the device identifier 605 is not represented in active entities storage 620, the entity activity tracker component 610 may persist the device identifier 605 in active entities storage 620. A device may become an "active entity" when its device identifier is newly represented in the active entities storage 620. A device may remain an active entity as long as the device's identifier is represented in active entities storage 620.

Within active entities storage 620, the device identifier 605 may be associated with a timestamp representing when the presence signal was received by the signal broker component 420 and/or a timestamp representing when the device identifier 605 was persisted in active entities storage 620. If the entity activity tracker component 610 determines the device identifier 605 is represented in active entities storage 620, the entity activity tracker component 610 may cause the timestamp(s), associated with the device identifier 605 in active entities storage 620, to be updated to represent when the recently received presence signal was received by the signal broker component 420. Active entities storage 620 may also associate a timestamp(s) with a location identifier (e.g., an identifier representing a location including one or more devices).

When the entity activity tracker component 610 persists the device identifier 605 in active entity storage 620 (or when the entity activity tracker component 610 updates the timestamp(s) of the device identifier 605 in active entity storage 620), the entity activity tracker component 610 may send the device identifier 605 to the event generator component 630. In response, the event generator component 630 may determine a service or device that has requested presence or vacancy information for the device identifier 605 in the past, and the event generator component 630 may send an instruction 615 to the orchestrator component 510. The instruction 615 may represent the orchestrator component 510 is to notify the service or device that someone is likely near (or is near) the device (associated with the device identifier 605) (e.g., in the situation where a guest has checked out of a hotel room but housekeeping is present in the hotel room).

Figure 7:
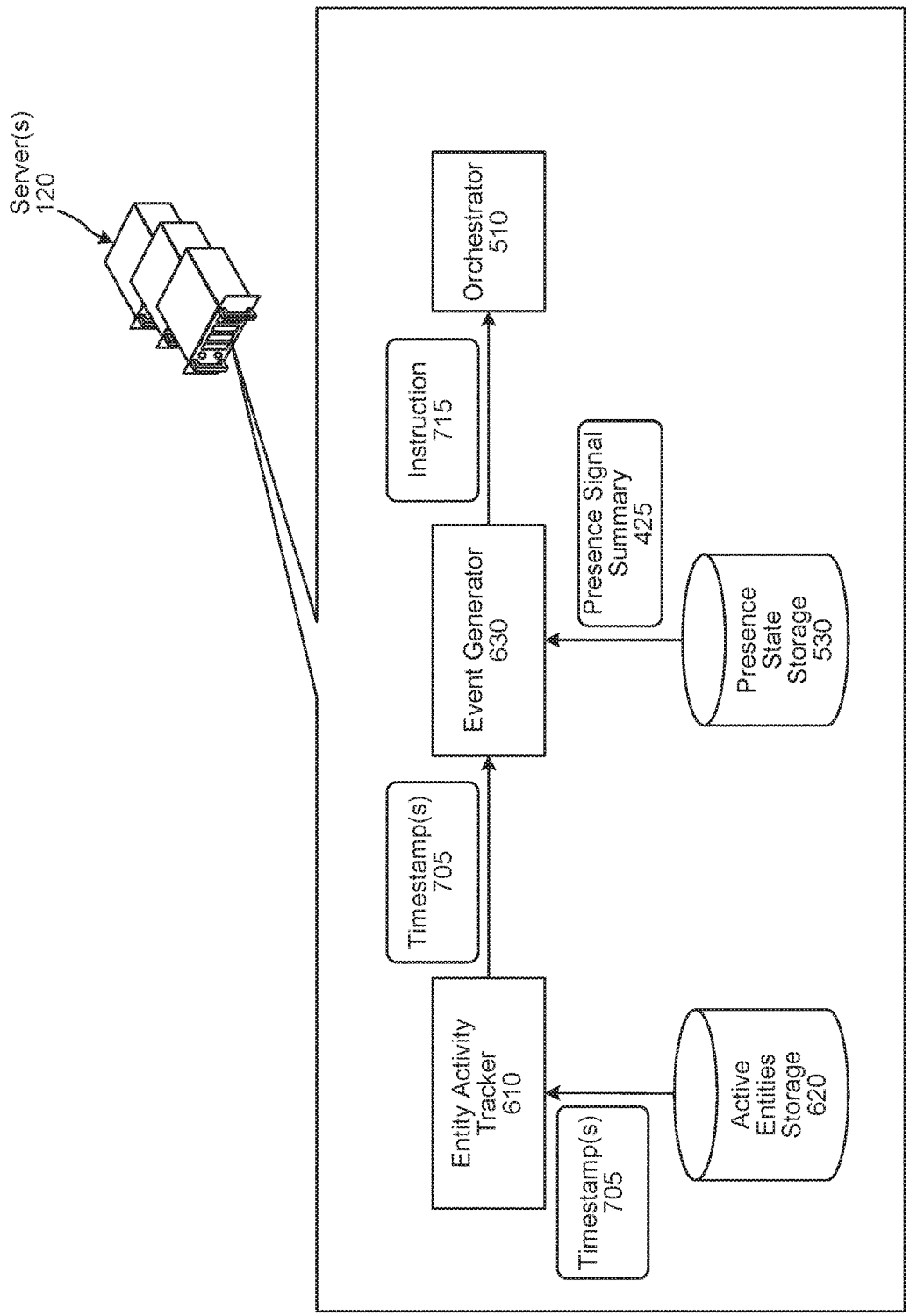
FIG. 7 is a conceptual diagram illustrating how presence or vacancy may be proactively determined according to embodiments of the present disclosure.

The event generator component 630 may also or alternatively proactively indicate presence or vacancy information without being triggered by the entity activity tracker component 610 (e.g., not in response to receiving the device identifier 605 from the entity activity tracker component 610) (as illustrated in FIG. 7). The event generator component 630 may have access to data representing when various services or devices will request presence or vacancy information from the system. For example, a smart home system (or human user) may routinely ask if a room is vacant (e.g., for purposes of performing room service of a hotel room, for purposes of turning lights off that were left on, for purposes of closing a garage door that was left open, etc.). The event generator component 630 may use such data to proactively determine presence or vacancy information, and proactively indicate same to a service or device.

Prior to a service or device requesting presence or vacancy information for a device or a location, the event generator component 630 may request and receive presence signal summary data 425 (associated with the device or the location) from presence stage storage 530. The presence signal summary data 425 may represent the type of the presence signal data 395, a device identifier associated with the presence signal data 395, a user identifier associated with the presence signal data 395, a location identifier associated with the presence signal data 395, a timestamp representing when the presence signal data 395 was received, a time interval as determined by the signal broker component 420, and/or a weight value representing the presence signal data 395's reliability in presence calculations. In at least some examples, presence signal data 395 may be specific to a particular user (e.g., may include a confidence value representing a likelihood that a particular user is present). In at least some other examples, presence signal data 395 may not be specific to any particular user (e.g., may include a confidence value representing a likelihood that an individual (but not any particular individual) is present).

The event generator component 630 may also request and receive a timestamp(s) 705 (associated with the device or location) from the entity activity tracker component 610 (which the entity activity tracker component 610 receives from active entities storage 620). The timestamp(s) 705 represents a time(s) when a presence signal(s) was most recently received from the device 110 or location.

The event generator component 630 uses the timestamp(s) 705 and the presence signal summary data 425 to determine whether it is appropriate to proactively indicate presence or vacancy to the service or device. The event generator component 630 may use the timestamp(s) 705 and the presence signal summary data 425 to generate a confidence value (e.g., a binned value or a numeric value) representing the event generator component 630's confidence that someone is present near the device or at the location (or is not present near the device or missing from the location). The event generator component 630 may implement one or more trained machine learning models to perform the aforementioned calculations.

The event generator component 630 may also determine whether to proactively indicate presence or vacancy based on a length of time between when a device recently became an "active entity." The shorter the length of time, the more likely the event generator component 630 may proactively indicate presence or vacancy, since a device becoming an active entity more recently may indicate someone is likely present.

The event generator component 630 may also determine whether to proactively indicate presence or vacancy based on if a device identifier recently become unrepresented in active entities storage 620. Data may be deleted from active entities storage 620 after a certain amount of time. For example, data associated with a device identifier may be deleted from active entities storage 620 if data associated with the device identifier is not newly persisted in active entities storage 620 within a threshold amount of time of previous data associated with the device identifier being persisted. An instance of a device identifier becoming unrepresented in active entities storage 620 may represent an area around the device is vacant.

The event generator component 630 may also determine whether to proactively indicate presence or vacancy based on output of the presence prediction component 520. When the presence prediction component 520 performs a presence calculation, the output of the presence calculation (e.g., a presence confidence value) may have a set amount of time that the presence calculation is valid. If the event generator component 630 is performing a calculation with respect to a device or location, and a presence calculation for the device or location performed by the presence prediction component 520 is still valid, the event generator component 630 may consider the presence prediction component 520's calculation in determining whether to proactively indicate presence or vacancy.

If the event generator component 630 determines presence or vacancy information should be proactively output, the event generator component 630 may send an instruction 715 to the orchestrator component 510. The instruction 715 may represent the orchestrator component 510 is to notify the service or device that someone is likely present (e.g., likely near a device or within a location) or likely not present (e.g., is likely not near a device or within a location).

As described, the presence prediction component 520 and the event generator component 630 may operate with respect to presence signals already represented in storage. As also described, presence signals may be interval signals, whereby a type of presence signal is received from a same source at regular intervals. If the presence prediction component 520 and/or the event generator component 630 determines a current time is located within a threshold time of an end of an interval signal's time interval, the presence prediction component 520 and/or the event generator component 630 may be configured to delay processing until the next interval signal is received, and use the subsequently received interval signal in presence or vacancy calculations. Such configuration of the presence prediction component 520 and/or the event generator component 630 allows for more accurate presence and/or vacancy determinations.

As described above, the signal broker component 420 may store the presence signal summary 425 to presence state storage 530. When the signal broker component 420 persists the presence signal summary 425 in presence state storage 530, the system may determine when the presence signal summary 425 is to expire (e.g., based on when the presence signal summary 425's time interval will expire). When the time interval of the presence signal summary 425 runs, the presence signal summary 425 may be deleted from presence state storage 530. When the presence signal summary 425 is deleted from presence state storage 530, a notification of the deletion may be sent to the event generator component 630. In response, the event generator component 630 may query the entity activity tracker 610 (or active entities storage 620 directly) regarding a last time the device/location (associated with the presence signal summary 425) became active (e.g., a last time the device's device identifier and/or location's location identifier was newly persisted in active entities storage 620).

Figure 8:
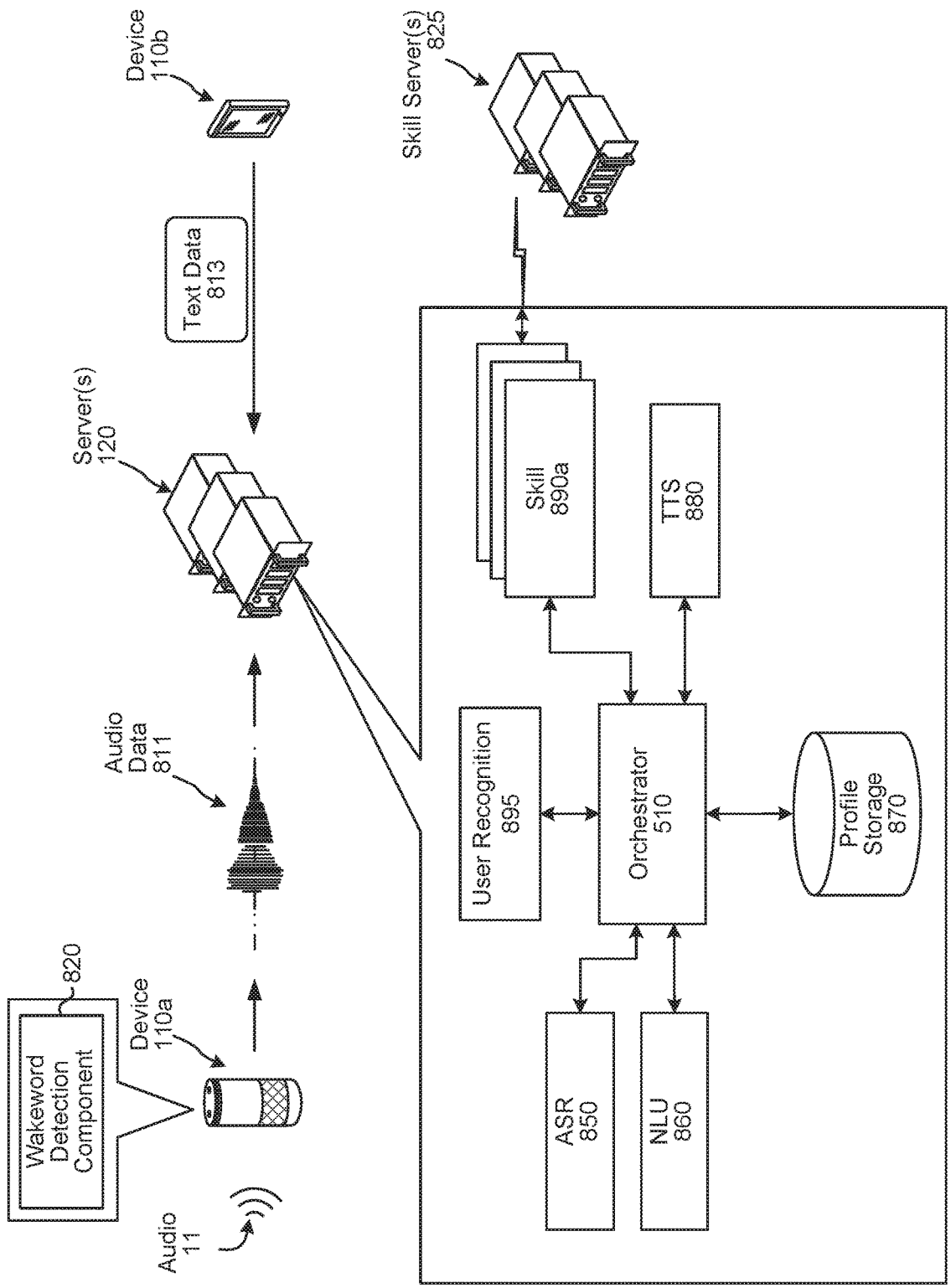
FIG. 8 is a conceptual diagram of components of a system according to embodiments of the present disclosure.

The system may operate using various components at runtime, as illustrated in FIG. 8. The various components may be located on same or different physical devices. Communication between various components may occur directly or across a network(s) 199.

An audio capture component(s), such as a microphone or array of microphones of the device 110a, may capture audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 820 to perform wakeword detection (e.g., to determine whether a user intended to speak an input to the device 110a). An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 820 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 811, representing the audio 11, to the server(s) 120. The audio data 811 may include data corresponding to the wakeword, or the portion of the audio data 811 corresponding to the wakeword may be removed by the device 110 prior to sending the audio data 811 to the server(s) 120.

Upon receipt by the server(s) 120, the audio data 811 may be sent to an orchestrator component 510. The orchestrator component 230 may include memory and logic that enables the orchestrator component 510 to transmit various pieces and forms of data to various components of the system, as well as perform other operations.

The orchestrator component 510 sends the audio data 811 to an ASR component 850. The ASR component 850 transcribes the audio data 811 into text data. The text data output by the ASR component 850 represents one or more than one (e.g., in the form of an N-best list) ASR hypotheses representing speech represented in the audio data 811. The ASR component 850 interprets the speech in the audio data 811 based on a similarity between the audio data 811 and pre-established language models. For example, the ASR component 850 may compare the audio data 811 with models for sounds (e.g., subword units, such as phonemes, etc.) and sequences of sounds to identify words that match the sequence of sounds of the speech represented in the audio data 811. The ASR component 850 sends the text data generated thereby to an NLU component 860, for example via the orchestrator component 510. The text data output by the ASR component 850 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

In some instances, a user (e.g., a human or another computing system) may provide a text-based user input. For example, a human user may provide a text-based user input to the device 110b. In such instances, the device 110b may generate text data 813, representing the text-based user input, and may send the text data 813 to the server(s) 120, for example via a companion application implemented by the device 110b. Upon receipt by the server(s) 120, the orchestrator component 510 (or another component of the server(s) 120) may send the text data 813 to the NLU component 860.

The NLU component 860 attempts to make a semantic interpretation of the phrase(s) or statement(s) represented in the text data (e.g., as generated by the ASR component 850 or as received from the device 110b) input therein. That is, the NLU component 860 determines one or more meanings associated with the phrase(s) or statement(s) represented in the text data based on words represented in the text data. The NLU component 860 determines an intent representing an action that a user desires be performed as well as pieces of the text data that allow a device (e.g., the device 110a, the device 110b, the server(s) 120, a skill component 890, a skill server(s) 825, etc.) to execute the intent. For example, if the text data corresponds to "play Adele music," the NLU component 860 may determine an intent that the system output music and may identify "Adele" as an artist. For further example, if the text data corresponds to "what is the weather," the NLU component 860 may determine an intent that the system output weather information associated with a geographic location of the device (110a/110b). In another example, if the text data corresponds to "turn off the lights," the NLU component 860 may determine an intent that the system turn off lights associated with the device (110a/110b) and/or the user.

The NLU component 860 may send NLU results data (which may include tagged text data, indicators of intent, etc.) to the orchestrator component 510. The orchestrator component 510 may send the NLU results data to a skill component(s) 890. If the NLU results data includes a single NLU hypothesis, the orchestrator component 510 may send the NLU results data to the skill component(s) 890 associated with the NLU hypothesis. If the NLU results data includes an N-best list of NLU hypotheses, the orchestrator component 510 may send the top scoring NLU hypothesis to a skill component(s) 890 associated with the top scoring NLU hypothesis.

A "skill component" may be software running on the server(s) 120 that is akin to a software application running on a traditional computing device. That is, a skill component 890 may enable the server(s) 120 to execute specific functionality in order to provide data or produce some other requested output. The server(s) 120 may be configured with more than one skill component 890. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 890 may operate in conjunction between the server(s) 120 and other devices, such as the device (110a/110b), in order to complete certain functions. Inputs to a skill component 890 may come from speech processing interactions or through other interactions or input sources. A skill component 890 may include hardware, software, firmware, or the like that may be dedicated to a particular skill component 890 or shared among different skill components 890.

In addition or alternatively to being implemented by the server(s) 120, a skill component 890 may be implemented by a skill server(s) 825. Such may enable a skill server(s) 825 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The server(s) 120 may be configured with a skill component 890 dedicated to interacting with the skill server(s) 825.

Unless expressly stated otherwise, reference to a skill, skill device, or skill component may include a skill component 890 operated by the server(s) 120 and/or skill operated by the skill server(s) 825. Moreover, the functionality described herein as a skill may be referred to using many different terms, such as an action, bot, app, or the like.

The server(s) 120 may include a TTS component 880 that generates audio data (e.g., synthesized speech) from text data using one or more different methods. Text data input to the TTS component 880 may come from a skill component 890, the orchestrator component 510, or another component of the system.

In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to create audio data including an artificial speech waveform.

Parametric synthesis uses a computerized voice generator, sometimes called a vocoder. Synthesized speech generated by the TTS component 880 may be output to the user 5 in response to a user input.

The server(s) 120 may include profile storage 870. The profile storage 870 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 870 may include one or more user profiles, with each user profile being associated with a different user identifier. Each user profile may include various user identifying information. Each user profile may also include preferences of the user; one or more device identifiers, representing one or more devices of the user; information representing skills that have been enabled for or by the user; as well as other information.

The profile storage 870 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 870 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 9:
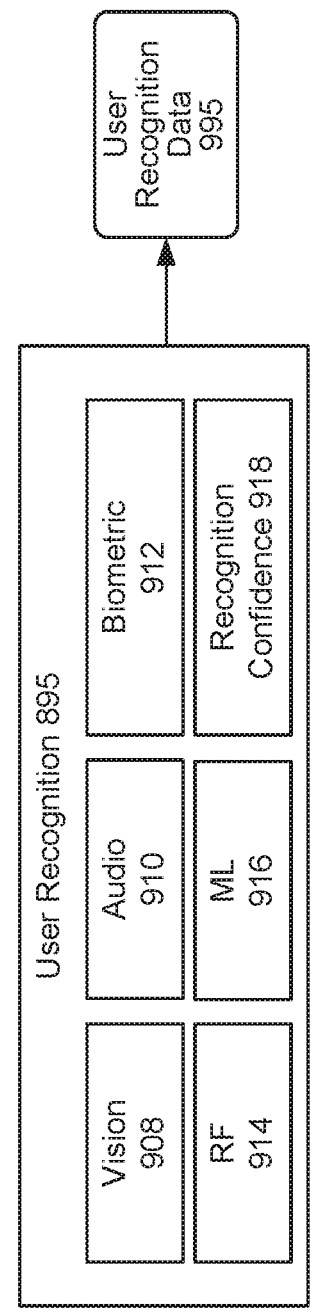
FIG. 9 is a schematic diagram of an illustrative architecture in which sensor data is combined to recognize one or more users according to embodiments of the present disclosure.

The server(s) 120 may include a user recognition component 895 that recognizes one or more users using a variety of data. As illustrated in FIG. 9, the user recognition component 895 may include one or more subcomponents including a vision component 908, an audio component 910, a biometric component 912, a radio frequency (RF) component 914, a machine learning (ML) component 916, and a recognition confidence component 918. In some instances, the user recognition component 895 may monitor data and determinations from one or more subcomponents to determine an identity of one or more users associated with data input to the system. The user recognition component 895 may output user recognition data 995, which may include a user identifier associated with a user the system believes is originating data input to the system. The user recognition data 995 may be used to inform processes performed by the orchestrator 510 or other components of the system. For example, output of the user recognition component 895 may be used to associate a presence signal with a particular user identifier in storage.

The vision component 908 may receive data from one or more sensors capable of providing images (e.g., cameras) or sensors indicating motion (e.g., motion sensors). The vision component 908 can perform facial recognition or image analysis to determine an identity of a user and to associate that identity with a user profile associated with the user. In some instances, when a user is facing a camera, the vision component 908 may perform facial recognition and identify the user with a high degree of confidence. In other instances, the vision component 908 may have a low degree of confidence of an identity of a user, and the user recognition component 895 may utilize determinations from additional components to determine an identity of a user. The vision component 908 can be used in conjunction with other components to determine an identity of a user. For example, the user recognition component 895 may use data from the vision component 908 with data from the audio component 910 to identify what user's face appears to be speaking at the same time audio is captured by a device 110 the user is facing for purposes of identifying a user who spoke an input to the system.

The system may include biometric sensors that transmit data to the biometric component 912. For example, the biometric component 912 may receive data corresponding to fingerprints, iris or retina scans, thermal scans, weights of users, a size of a user, pressure (e.g., within floor sensors), etc., and may determine a biometric profile corresponding to a user. The biometric component 912 may distinguish between a user and sound from a television, for example. Thus, the biometric component 912 may incorporate biometric information into a confidence level for determining an identity of a user. Biometric information output by the biometric component 912 can be associated with specific user profile data such that the biometric information uniquely identifies a user profile of a user.

The RF component 914 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 914 the strength of the signal (e.g., as a received signal strength indication (RSSI)). The RF component 914 may use the RSSI to determine an identity of a user (with an associated confidence level). In some instances, the RF component 914 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system for purposes of the system determining who spoke a particular input. Such a registration may occur prior to, during, or after speaking of an input.

The ML component 916 may track the behavior of various users as a factor in determining a confidence level of the identity of the user. By way of example, a user may adhere to a regular schedule such that the user is at a first location during the day (e.g., at work or at school). In this example, the ML component 916 would factor in past behavior and/or trends into determining the identity of the user that provided input to the system. Thus, the ML component 916 may use historical data and/or usage patterns over time to increase or decrease a confidence level of an identity of a user.

In some instances, the recognition confidence component 918 receives determinations from the various components 908, 910, 912, 914, and 916, and may determine a final confidence level associated with the identity of a user. In some instances, the confidence level may determine whether an action is performed. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 995.

The audio component 910 may receive data from one or more sensors capable of providing an audio signal (e.g., one or more microphones) to facilitate recognition of a user. The audio component 910 may perform audio recognition on an audio signal to determine an identity of the user and associated user identifier. In some instances, aspects of the server(s) 120 may be configured at a computing device (e.g., a local server). Thus, in some instances, the audio component 910 operating on a computing device may analyze all sound to facilitate recognition of a user. In some instances, the audio component 910 may perform voice recognition to determine an identity of a user.

The audio component 910 may also perform user identification based on audio data 811 input into the system for speech processing. The audio component 910 may determine scores indicating whether speech in the audio data 811 originated from particular users. For example, a first score may indicate a likelihood that speech in the audio data 811 originated from a first user associated with a first user identifier, a second score may indicate a likelihood that speech in the audio data 811 originated from a second user associated with a second user identifier, etc. The audio component 910 may perform user recognition by comparing audio characteristics representing the audio data 811 to stored audio characteristics of users (associated with the device 110 that captured the spoken user input).

Figure 10:
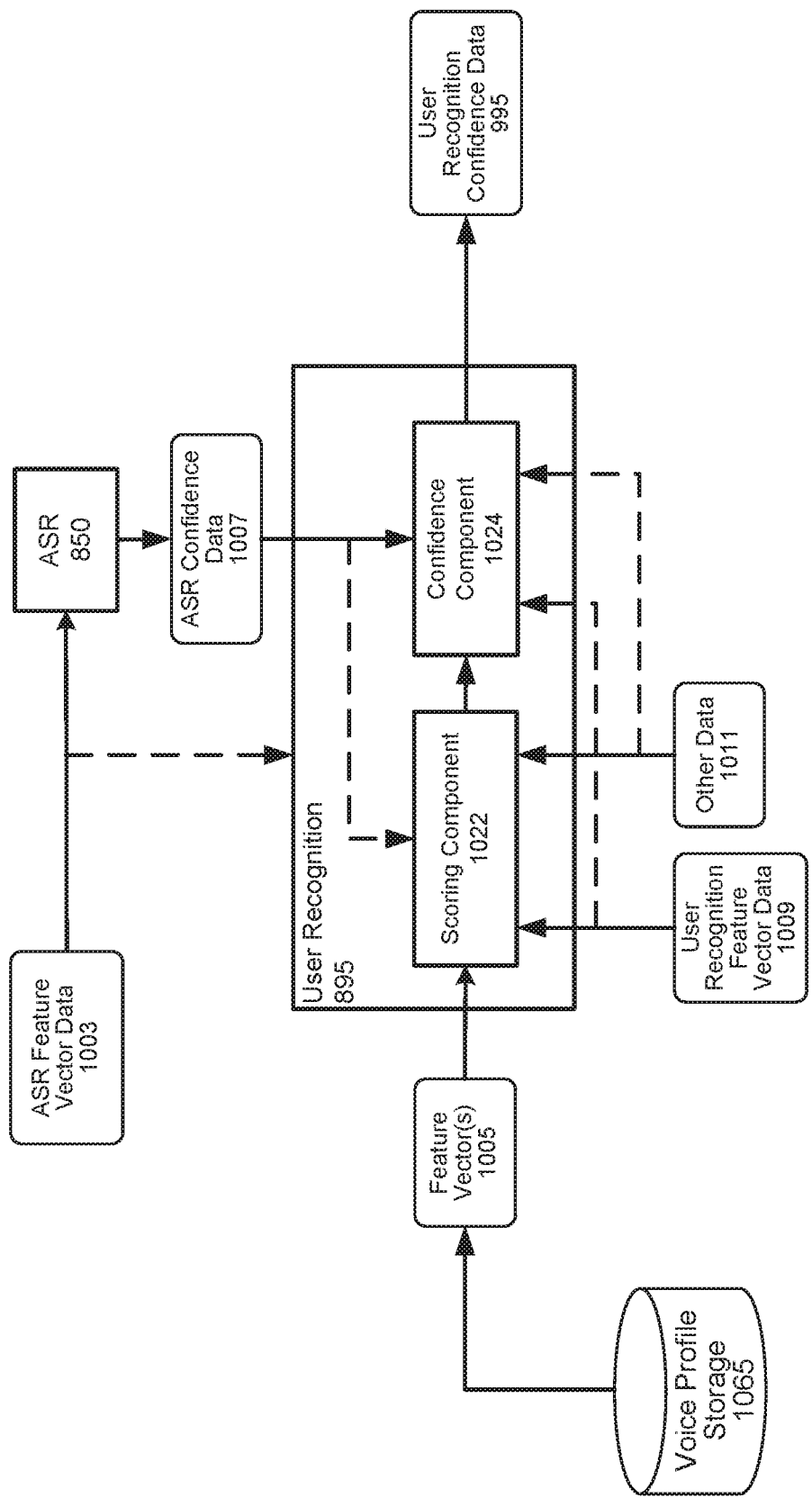
FIG. 10 is a system flow diagram illustrating user recognition according to embodiments of the present disclosure.

FIG. 10 illustrates user recognition as performed by the server(s) 120. The ASR component 850 performs ASR on ASR feature vector data 1003 as described above. ASR confidence data 1007 is passed to the user recognition component 895.

The user recognition component 895 performs user recognition using various data including user recognition feature vector data 1009, feature vectors 1005 representing known voice profiles, the ASR confidence data 1007, and other data 1009. The user recognition component 895 may then output user recognition confidence data 995 which reflects a certain confidence that speech was spoken by one or more particular users. The user recognition confidence data 995 may include one or more user profile identifiers. Each identifier in the user recognition confidence data 995 may be associated with a respective confidence value, representing a likelihood that the speech corresponds to the identifier. A confidence value may be a numeric or binned value as discussed herein.

The feature vector(s) 1005 input to the user recognition component 895 may correspond to one or more voice profiles (stored in voice profile storage 1065). The user recognition component 895 may use the feature vector(s) 1005 to compare against the user recognition feature vector 1009, representing speech detected by the system, to determine whether the user recognition feature vector 1009 corresponds to one or more of the feature vectors 1005 of known voice profiles.

Each feature vector 1005 may be the same size as the user recognition feature vector 1009.

To perform user recognition, the user recognition component 895 may determine the device from which the audio data representing speech originated. For example, the audio data may be associated with metadata including a device identifier representing the device 110. Either the device 110 or the server(s) 120 may generate the metadata. The server(s) 120 may determine a group profile identifier associated with the device identifier, may determine user profile identifiers associated with the group profile identifier, and may include the group profile identifier and/or the user profile identifiers in the metadata. The server(s) 120 may associate the metadata with the user recognition feature vector 1009 produced from the audio data. The user recognition component 895 may send a signal to the voice profile feature storage 1065, with the signal requesting only feature vectors 1005 associated with the device identifier, the group profile identifier, and/or the user profile identifiers represented in the metadata. This limits the universe of possible feature vectors 1005 the user recognition component 895 should consider and, thus, decreases the amount of time to perform user recognition by decreasing the amount of feature vectors 1005 needed to be processed. Alternatively, the user recognition component 895 may access all (or some other subset of) feature vectors 1005 available to the user recognition component 895. However, accessing all feature vectors 1005 will likely increase the amount of time needed to perform user recognition based on the magnitude of feature vectors to be processed.

The user recognition component 895 may attempt to identify a user that spoke the speech represented in the audio data by comparing the user recognition feature vector 1009 to the received feature vector(s) 1005. The user recognition component 895 may include a scoring component 1022 that determines respective scores indicating whether the speech (represented by the user recognition feature vector 1009) was spoken by one or more particular users (represented by the feature vector(s) 1005). The user recognition component 895 may also include a confidence component 1024 that determines an overall accuracy of user recognition operations (such as those of the scoring component 1022) and/or an individual confidence value with respect to each user potentially identified by the scoring component 1022. The output from the scoring component 1022 may include a different confidence value for each received feature vector 1005. For example, the output may include a first confidence value for a first feature vector, a second confidence value for a second feature vector, etc. Although illustrated as two separate components, the scoring component 1022 and confidence component 1024 may be combined into a single component or may be separated into more than two components.

The scoring component 1022 and confidence component 1024 may implement one or more trained machine learning models (such neural networks, classifiers, etc.) as known in the art. For example, the scoring component 1022 may use probabilistic linear discriminant analysis (PLDA) techniques. PLDA scoring determines how likely it is that the user recognition feature vector 1009 corresponds to a particular feature vector 1005. The PLDA scoring may generate a confidence value for each feature vector 1005 considered and may output a list of confidence values associated with respective user profile identifiers, implicit voice profile identifiers, and/or explicit voice profile identifiers. The scoring component 1022 may also use other techniques, such as GMMs, generative Bayesian models, or the like, to determine confidence values.

The confidence component 1024 may input various data including information about the ASR confidence 1007, speech length (e.g., number of frames or time of the user input), audio condition/quality data (such as signal-to-interference data or other metric data), fingerprint data, image data, or other factors to consider how confident the user recognition component 895 is with regard to the confidence values linking users to the user input. The confidence component 1024 may also consider the confidence values and associated identifiers output by the scoring component 1022. Thus, the confidence component 1024 may determine that a lower ASR confidence 1007, or poor audio quality, or other factors, may result in a lower confidence of the user recognition component 895. Whereas a higher ASR confidence 1007, or better audio quality, or other factors, may result in a higher confidence of the user recognition component 895. Precise determination of the confidence may depend on configuration and training of the confidence component 1024 and the models implemented thereby. The confidence component 1024 may operate using a number of different machine learning models/techniques such as GMM, neural networks, etc. For example, the confidence component 1024 may be a classifier configured to map a score output by the scoring component 1022 to a confidence value.

The user recognition component 895 may output user recognition confidence data 995 specific to a single user profile identifier (or more than one user profile identifier in the form of an N-best list). The user recognition confidence data 995 may include numeric confidence values (e.g., 0.0-1.0, 0-1000, or whatever scale the system is configured to operate). Thus the user recognition confidence data 995 may output an N-best list of potential users with numeric confidence values (e.g., user profile identifier 123—0.2, implicit voice profile identifier 234—0.8). Alternatively or in addition, the user recognition confidence data 995 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 895 may output an N-best list of potential users with binned confidence values (e.g., user profile identifier 123—low, implicit voice profile identifier 234—high). Combined binned and numeric confidence value outputs are also possible. Rather than a list of identifiers and their respective confidence values, the user recognition confidence data 995 may only include information related to the top scoring identifier as determined by the user recognition component 895. The user recognition component 895 may also output an overall confidence value that the individual confidence values are correct, where the overall confidence value indicates how confident the user recognition component 895 is in the output results. The overall confidence value may be determined by the confidence component 1024.

The confidence component 1024 may determine differences between individual confidence values when determining the user recognition confidence data 995. For example, if a difference between a first confidence value and a second confidence value is large, and the first confidence value is above a threshold confidence value, then the user recognition component 895 is able to recognize a first user (associated with the feature vector 1005 associated with the first confidence value) as the user that spoke the user input with a much higher confidence than if the difference between the confidence values were smaller.

The user recognition component 895 may perform thresholding to avoid incorrect user recognition results being output. For example, the user recognition component 895 may compare a confidence value output by the confidence component 1024 to a threshold confidence value. If the confidence value does not satisfy (e.g., does not meet or exceed) the threshold confidence, the user recognition component 895 may not output user recognition confidence data 995, or may only include in that data 995 an indication that a user could not be recognized. Further, the user recognition component 895 may not output user recognition confidence data 995 until enough user recognition feature vector data 709 is accumulated and processed to verify a user above a threshold confidence. Thus, the user recognition component 895 may wait until a sufficient threshold quantity of audio data has been processed before outputting user recognition confidence data 995. The quantity of received audio data may also be considered by the confidence component 1024.

The user recognition component 895 may be defaulted to output binned (e.g., low, medium, high) user recognition confidence values. However, such may be problematic in certain situations. For example, if the user recognition component 895 computes a single binned confidence value for multiple feature vectors 1005, the system may not be able to effectively determine which user originated the user input. In this situation, the user recognition component 895 may be configured to override its default setting and output numeric confidence values. This enables the system to determine a user associated with the highest numeric confidence value originated the user input.

The user recognition component 895 may use other data 1011 to inform user recognition processing. Thus, a trained model or other component of the user recognition component 895 may be trained to take other data 1011 as an input feature when performing recognition. Other data 1011 may include a wide variety of data types depending on system configuration and may be made available from other sensors, devices, or storage. The other data 1011 may include a time of day at which audio data was generated by a device or received from the device, a day of a week in which audio data was generated by a device or received from the device 110, etc.

The other data 1011 may include image data or video data. For example, facial recognition may be performed on image data or video data received from a device from which the audio data was received (or another device). Facial recognition may be performed by the user recognition component 895, or another component of the server(s) 120. The output of facial recognition processing may be used by the user recognition component 895. That is, facial recognition output data may be used in conjunction with the comparison of the user recognition feature vector 1009 and one or more feature vectors 1005 to perform more accurate user recognition.

The other data 1011 may include location data of a device. The location data may be specific to a building within which the device is located. For example, if the device is located in user A's bedroom, such location may increase a user recognition confidence value associated with user A and/or decrease a user recognition confidence value associated with user B.

The other data 1011 may include data indicating a device type. Different types of devices may include, for example, a smart watch, a smart phone, a tablet computer, and a vehicle. The type of the device may be indicated in a profile associated with the device. For example, if the device from which audio data was received is a smart watch or vehicle belonging to a user A, the fact that the device belongs to user A may increase a user recognition confidence value associated with user A and/or decrease a user recognition confidence value associated with user B.

The other data 1011 may include geographic coordinate data associated with a device. For example, a group profile associated with a vehicle may indicate multiple users (e.g., user A and user B). The vehicle may include a global positioning system (GPS) indicating latitude and longitude coordinates of the vehicle when audio data is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device. The global coordinates and associated locations may be associated with one or more respective users.

The other data 1011 may include addition data representing activity of a particular user that may be useful in performing user recognition. For example, if a user has recently entered a code to disable a home security alarm, and audio data was received from a device represented in a group profile associated with the home, signals from the home security alarm about the disabling user, time of disabling, etc. may be reflected in the other data 1011 and considered by the user recognition component 895. If a mobile device (such as a smart phone, Tile, dongle, or other device) known to be associated with a particular user is detected proximate to (for example physically close to, connected to the same WiFi network as, or otherwise nearby) the device, this may be reflected in the other data 1011 and considered by the user recognition component 895.

Depending on system configuration, the other data 1011 may be configured to be included in the user recognition feature vector data 1009 so that all the data relating to the situation of a device is included in a single feature vector. Alternatively, the other data 1011 may be reflected in one or more different data structures to be processed by the scoring component 1022.

Figure 11:
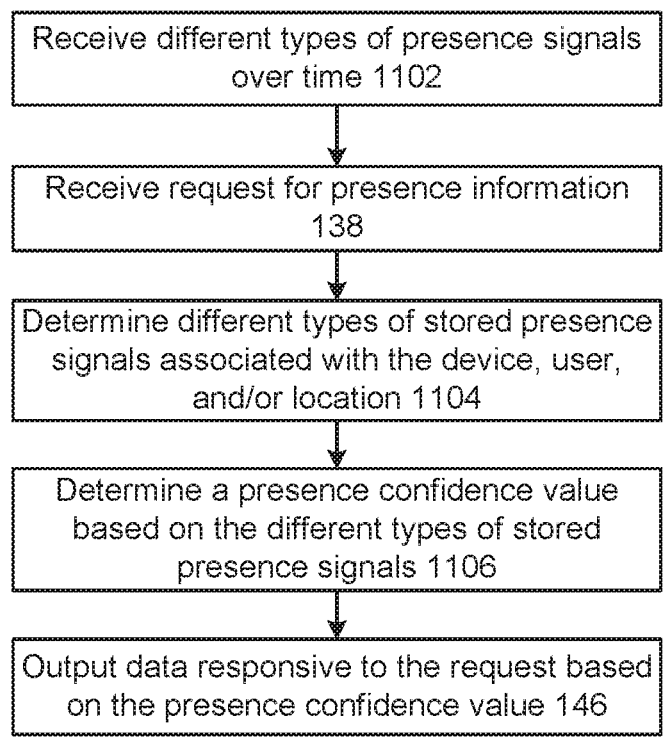
FIG. 11 is a flow diagram illustrating how different types of presence signals may be used to determine a presence confidence in response to a request for presence information according to embodiments of the present disclosure.

FIG. 11 illustrates how different types of presence signals may be used to determine a presence confidence in response to a request for presence information. The system receives (1102), over time, different types of presence signals for a particular (or particular combination of) device identifier, location identifier, or user identifier. The different types of presence signals may correspond to one or more different types of ad hoc signals (e.g., signals that are not expected to be received at regular intervals) and/or one or more different types of regular-interval signals. Type of ad hoc signals include, for example, wakeword signals (e.g., generated when a device 110 detects a spoken user input), user identifier signals (e.g., generated when an identity of a user that provided a user input is determined), touch event signals (e.g., generated when a user physically interacts with a device), ultrasonic signals, etc. Types of regular interval signal include, for example, AED signals, GPS signals, heart rate signals, etc.

At some point, the system may receive (138) a request for presence information associated with the particular (or particular combination of) device identifier, location identifier, or user identifier. In response to receiving the request, the system may determine (1104) different types of stored presence signals associated with the particular (or particular combination of) device identifier, location identifier, or user identifier. The system may determine (1106) a presence confidence value based on the different types of stored presence signals determined at step 1104. The system may thereafter output (146) data responsive to the request based on the presence confidence value.

Figure 12:
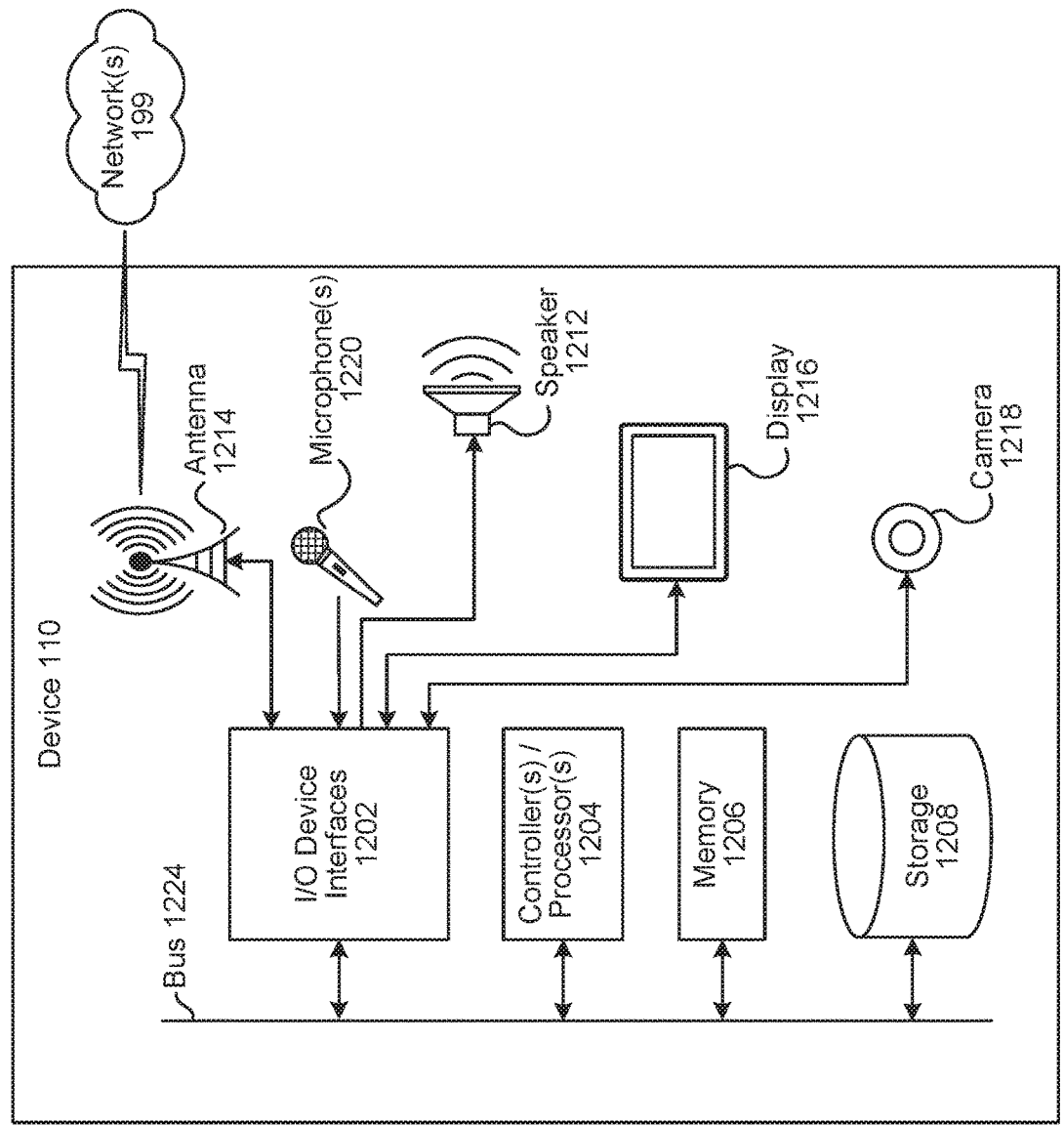
FIG. 12 is a block diagram conceptually illustrating example components of a device according to embodiments of the present disclosure.
Figure 13:
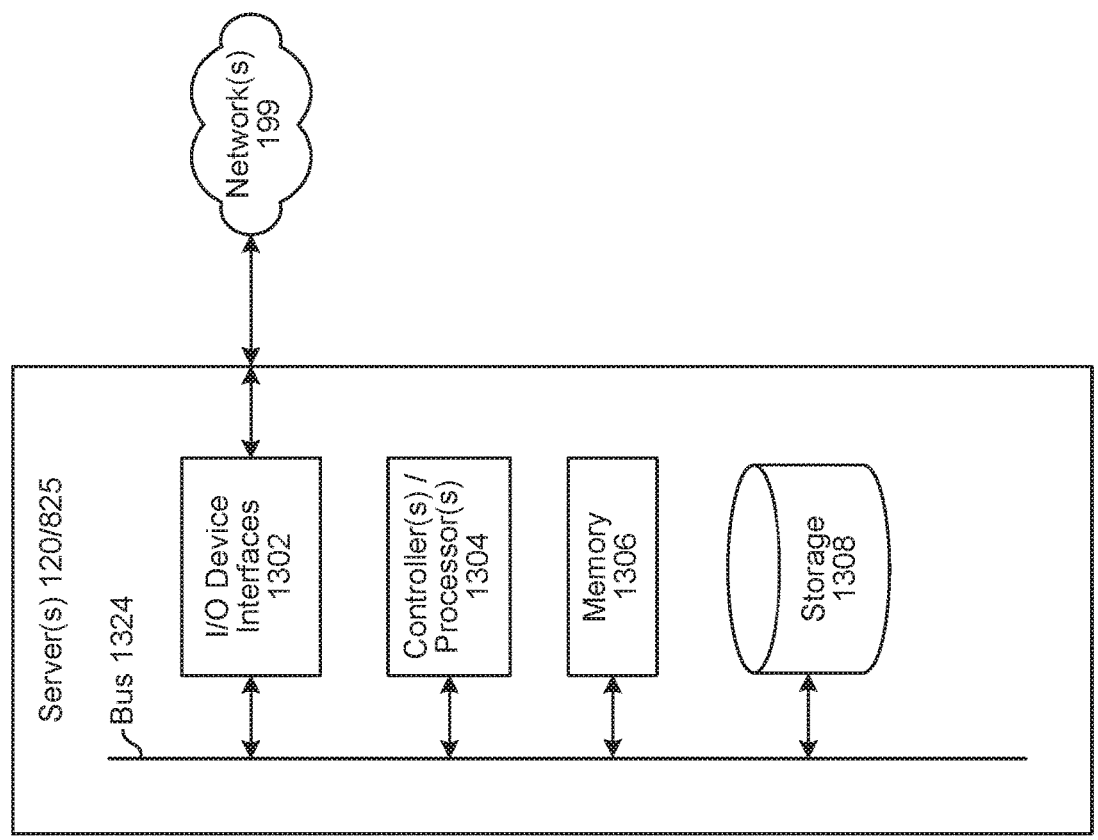
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the server(s) 120, which may assist with ASR processing, NLU processing, etc., and the skill server(s) 825. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/825) may be included in the system, such as one or more servers 120 for performing ASR processing, one or more servers 120 for performing NLU processing, one or more skill server(s) 825 for performing actions responsive to user inputs, etc. In operation, each of these devices (or groups of devices) may include computer-readable and computer-executable instructions that reside on the respective device (120/825), as will be discussed further below.

Each of these devices (110/120/825) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/825) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/825) may also be connected to removable or external non-volatile memory and/or storage (such as a removable memory card, memory key drive, networked storage, etc.) through respective input/output device interfaces (1202/1302).

Computer instructions for operating each device (110/120/85) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/825) includes input/output device interfaces (1202/1302). A variety of components may be connected through the input/output device interfaces (1202/1302), as will be discussed further below. Additionally, each device (110/120/825) may include an address/data bus (1224/1324) for conveying data among components of the respective device. Each component within a device (110/120/825) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the server(s) 120, or the skill server(s) 825 may include their own dedicated processors, memory, and/or storage. Alternatively, one or more of the components of the device(s) 110, the server(s) 120, or the skill server(s) 225 may utilize the I/O interfaces (1202/1302), processor(s) (1204/1304), memory (1206/1306), and/or storage (1208/1308) of the device(s) 110 server(s) 120, or the skill server(s) 825, respectively. Thus, the ASR component 850 may have its own I/O interface(s), processor(s), memory, and/or storage; the NLU component 860 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 825, as described herein, are illustrative, and may be located as a stand-alone device or may be included, in whole or in part, as a component of a larger device or system.

Figure 14:
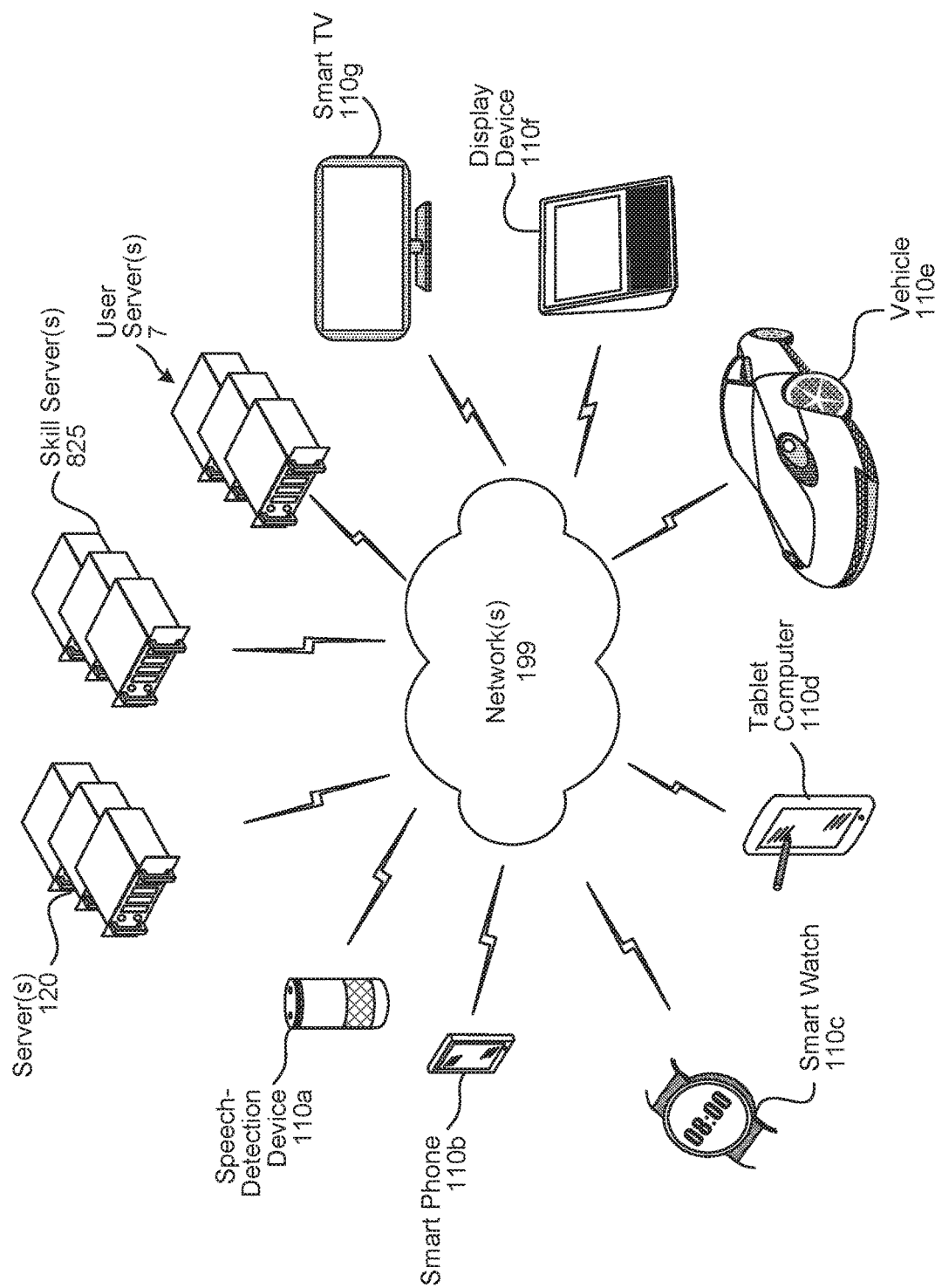
FIG. 14 illustrates an example of a computer network for use with the speech processing system.

As illustrated in FIG. 14, multiple devices (7, 110a-110g, 120, 825) may contain components of the system and the devices may be connected over a network(s) 199. The network(s) 199 may include a local or private network or may include a wide network such as the Internet. Devices may be connected to the network(s) 199 through either wired or wireless connections. For example, the user server (s) 7, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 825, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 850, the NLU component 860, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z).

Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    during a first time period:
        receiving, from a first device, a first signal representing presence of a human in an environment of the first device, the first signal corresponding to a first signal type received at regular intervals;
        receiving, from the first device, a second signal representing presence of a human in the environment, the second signal corresponding to a second signal type based on user interaction with the first device; and
        storing an association between the first signal, the second signal, and a device identifier representing the first device;
    during a second time period after the first time period:
        receiving, from a second device, a request for whether a human is in the environment;
        after receiving the request, identifying, based at least in part on the association, first stored presence information based at least in part on the first signal and second stored presence information based at least in part on the second signal;
        generating a presence confidence value based at least in part on the first stored presence information and the second stored presence information; and
        based at least in part on the presence confidence value, sending, to the second device, first data representing whether a human is in the environment.

2. The method of claim 1, further comprising:
    based at least in part on the first signal type, determining a first weight value associated with the first signal; and
    based at least in part on the second signal type, determining a second weight value associated with the second signal,
    wherein generating the presence confidence value is further based at least in part on the first weight value and the second weight value.

3. The method of claim 2, further comprising:
    based at least in part on the first signal type, determining a length of time corresponding to an expected future receipt of further presence information corresponding to the first signal type,
    wherein determining the first weight value is further based at least in part on the length of time.

4. A method, comprising:
    receiving, from a first device, a request for presence information associated with a second device;
    identifying first stored presence information associated with the second device, the first stored presence information corresponding to a first signal type received at regular intervals;
    identifying second stored presence information corresponding to a second signal type based on user interaction with the second device;
    generating a presence confidence value based at least in part on the first stored presence information and second stored presence information; and
    sending, to the first device, first data representing the presence confidence value.

5. The method of claim 4, further comprising:
    determining a first weight value based at least in part on the first signal type; and
    determining a second weight value based at least in part on the second signal type
    wherein generating the presence confidence value is further based at least in part on the first weight value and the second weight value.

6. The method of claim 4, further comprising:
    determining a second request for presence information associated with the second device will be received from the first device;
    based at least in part on determining the second request will be received, identifying a length of time corresponding to a decaying reliability value of the first stored presence information and a timestamp;
    determining a current time;
    generating a second presence confidence value based at least in part on the length of time, the timestamp, and the current time; and
    sending, to the first device, second data representing the second presence confidence value.

7. The method of claim 4, further comprising:
    receiving, from a third device, a signal representing presence of a human near the third device;
    based at least in part on receiving the signal, generating a second presence confidence value; and
    sending, to the first device, second data representing the second presence confidence value.

8. The method of claim 4, further comprising:
    based at least in part on the first signal type, a length of time corresponding to a decaying reliability value of the first stored presence information,
    wherein generating the presence confidence value is further based at least in part on the length of time.

9. The method of claim 8, further comprising:
    determining a first signal corresponding to the first stored presence information, the first signal being received from the second device and corresponding to the first signal type;
    determining a future time when a second signal, corresponding to the first signal type, will be received from the second device; and
    determining the length of time based at least in part on the future time.

10. The method of claim 4, further comprising:
    receiving, from a third device, a second request for presence information associated with a user identifier;
    identifying the second stored presence information associated with the user identifier;
    generating a second presence confidence value based at least in part on the second stored presence information; and
    sending, to the third device, second data representing the second presence confidence value.

11. A system, comprising:
    at least one processor; and
    at least one memory comprising instructions that, when executed by the at least one processor, cause the system to:
        receive, from a first device, a request for presence information associated with a second device;

identify first stored presence information associated with the second device, the first stored presence information corresponding to a first signal type received at regular intervals;

identify second stored presence information corresponding to a second signal type based on user interaction with the second device;

generate a presence confidence value based at least in part on the first stored presence information and second stored presence information; and send, to the first device, first data representing the presence confidence value.

12. The system of claim 11, wherein the at least one memory further comprises instructions that, when executed by the at least one processor, further cause the system to:

determine a first weight value based at least in part on the first signal type; and determine a second weight value based at least in part on the second signal type, wherein generation of the presence confidence value is further based at least in part on the first weight value and the second weight value.

13. The system of claim 11, wherein the at least one memory further comprises instructions that, when executed by the at least one processor, further cause the system to:

determine a second request for presence information associated with the second device will be received from the first device;

based at least in part on determining the second request will be received, identify a length of time corresponding to a decaying reliability value of the first stored presence information and a timestamp;

determine a current time;

generate a second presence confidence value based at least in part on the length of time, the timestamp, and the current time; and send, to the first device, second data representing the second presence confidence value.

14. The system of claim 11, wherein the at least one memory further comprises instructions that, when executed by the at least one processor, further cause the system to:

receive, from a third device, a signal representing presence of a human near the third device;

based at least in part on receiving the signal, generate a second presence confidence value; and send, to the first device, second data representing the second presence confidence value.

15. The system of claim 11, wherein the at least one memory further comprises instructions that, when executed by the at least one processor, further cause the system to:

determine, based at least in part on the first signal type, a length of time corresponding to a decaying reliability value of the first stored presence information, wherein generation of the presence confidence value is further based at least in part on the length of time.

16. The system of claim 15, wherein the at least one memory further comprises instructions that, when executed by the at least one processor, further cause the system to:

determine a first signal corresponding to the first stored presence information, the first signal being received from the second device and corresponding to the first signal type;

determine a future time when a second signal, corresponding to the first signal type, is expected to be received from the second device; and determine the length of time based at least in part on the future time.

\* \* \* \* \*